Figure 3:
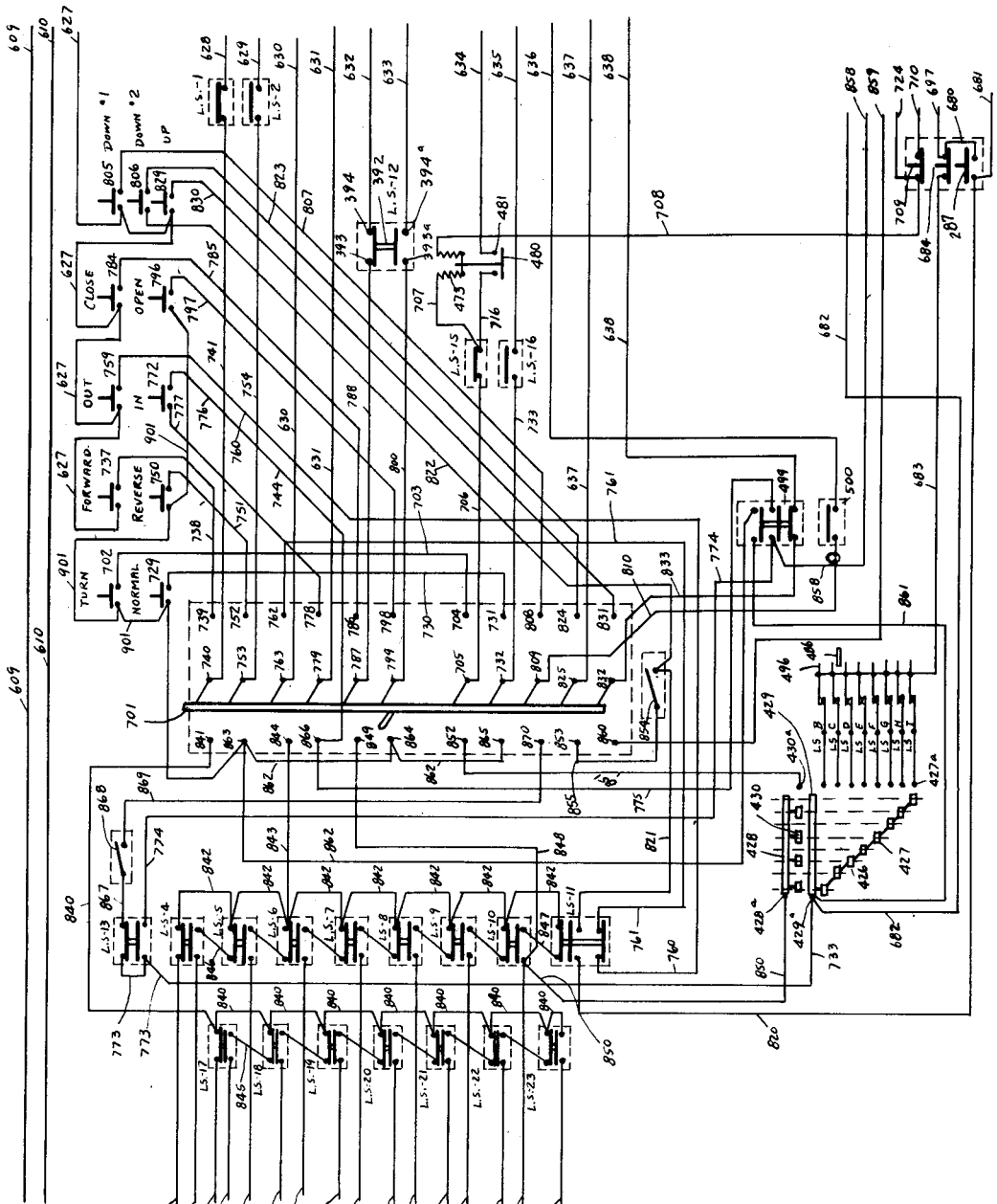

May 10, 1927.

G. E. LUCE 1,627,656

HACKING MACHINE

Filed Feb. 23, 1926

9 Sheets-Sheet 1

INVENTOR.
GRAFTON E. LUCE.

BY

ATTORNEYS.

May 10, 1927.

G. E. LUCE 1,627,656

HACKING MACHINE

Filed Feb. 23, 1926

9 Sheets-Sheet 2

FIG. 2

INVENTOR.
GRAFTON E. LUCE.

BY

ATTORNEYS.

May 10, 1927.

G. E. LUCE 1,627,656

HACKING MACHINE

Filed Feb. 23, 1926

9 Sheets-Sheet 6

INVENTOR.
GRAFTON E. LUCE.
BY
ATTORNEYS.

May 10, 1927.

G. E. LUCE 1,627,656

HACKING MACHINE

Filed Feb. 23, 1926

9 Sheets-Sheet 7

INVENTOR.
GRAFTON E. LUCE.
BY
ATTORNEYS.

May 10, 1927.
G. E. LUCE
1,627,656
HACKING MACHINE
Filed Feb. 23, 1925 9 Sheets-Sheet 8
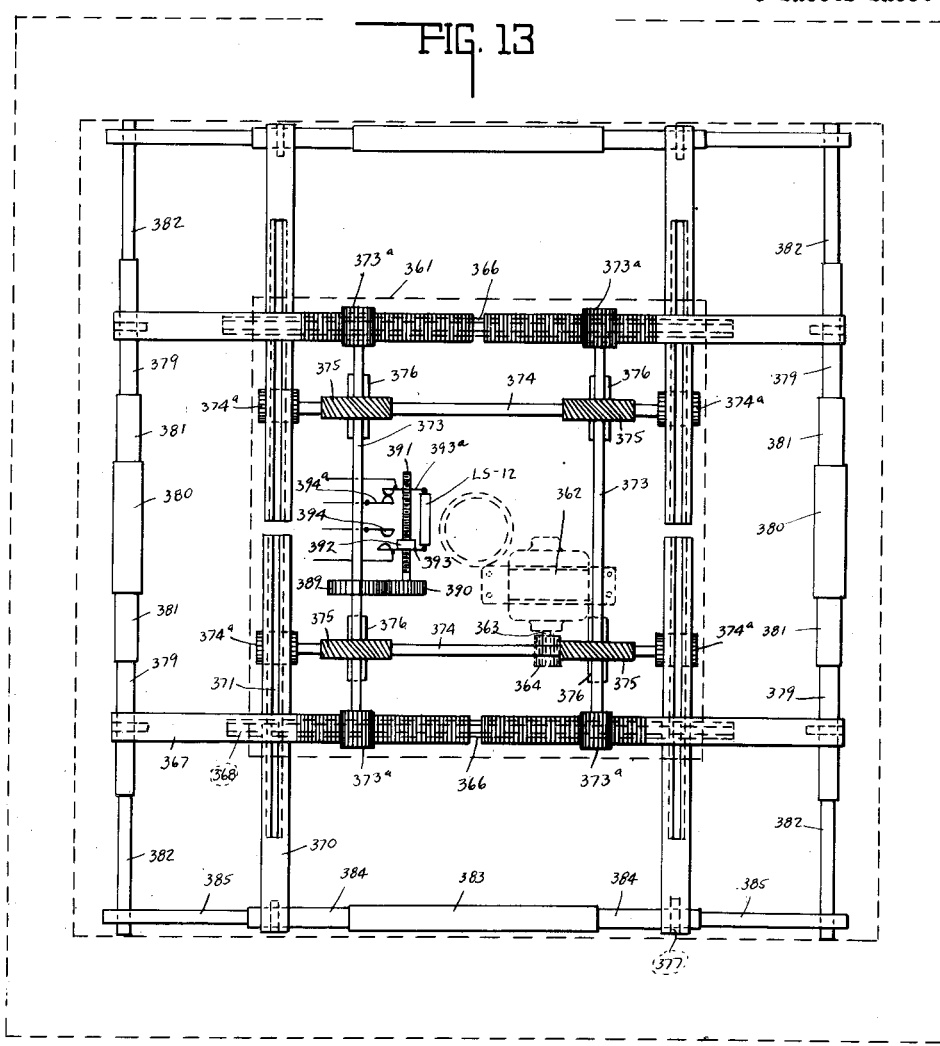
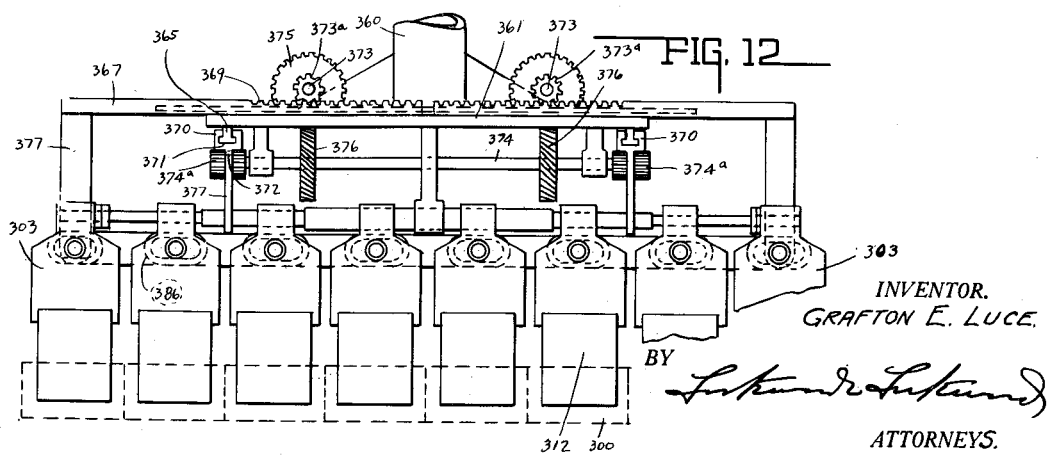
INVENTOR.
GRAFTON E. LUCE.
BY
ATTORNEYS.

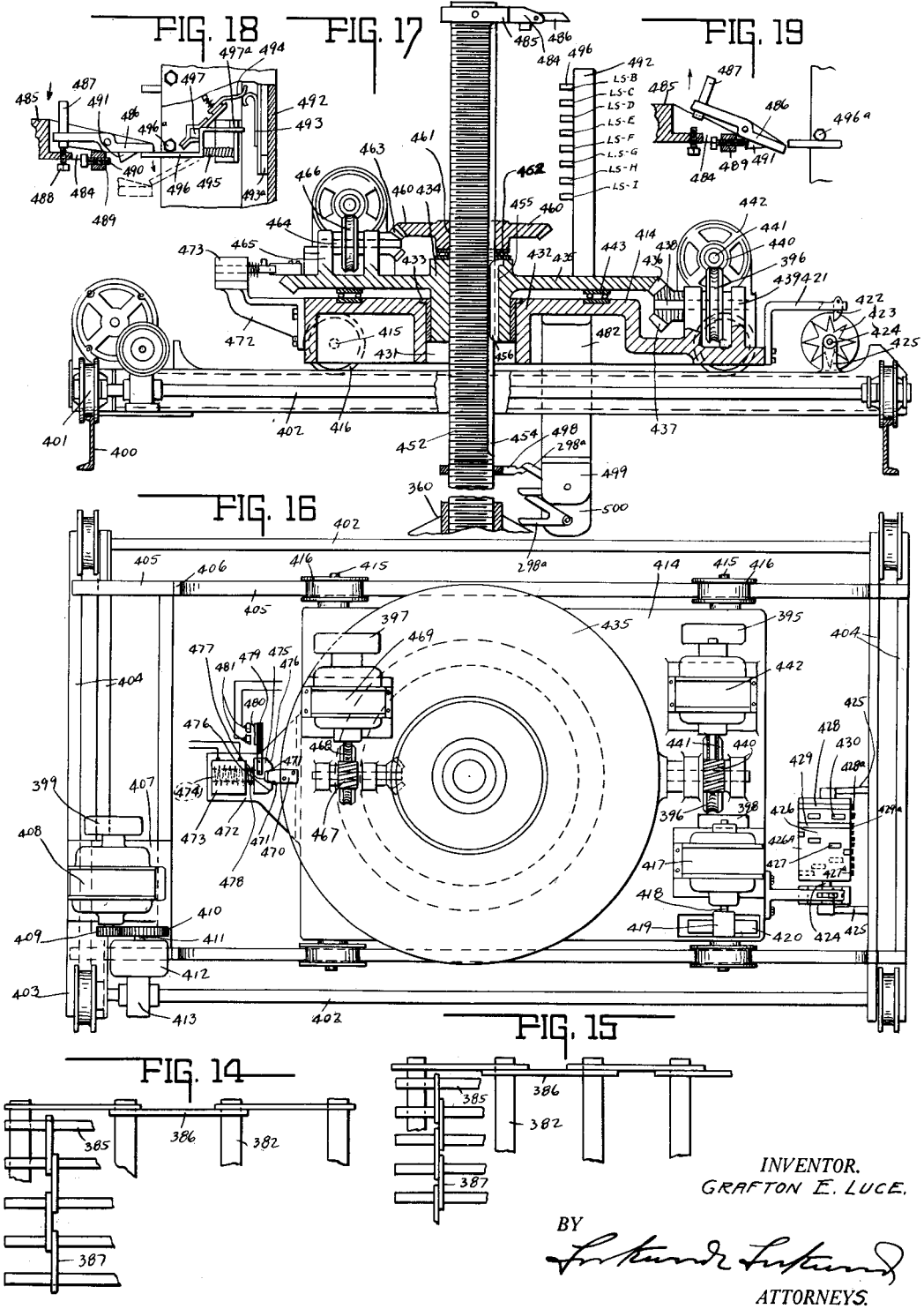

Patented May 10, 1927.

1,627,656

UNITED STATES PATENT OFFICE.

GRAFTON E. LUCE, OF CHICAGO, ILLINOIS.

HACKING MACHINE.

Application filed February 23, 1926. Serial No. 90,172.

This invention relates to an improved method of handling articles such as brick and the like, which is generically known as hacking, and the machinery for handling them as indicated.

The term "cross-hacking" in the brick and similar arts and herein, includes the idea of arranging layers of brick with the brick of one layer having a predetermined angular relation to the brick of another layer. The term "segregation" includes the idea of arranging the brick of a layer in predetermined relation with respect to each other.

The chief object of the invention is to mechanically handle brick in the one remaining step in the process of manufacturing of the brick where heretofore and at the present time, manual handling and not mechanical handling is used. With the present invention, used in conjunction with other machines at present in use, brick can be mechanically handled from the beginning of the brick formation to the loading of the completed brick in the shipping container, with none of the disadvantages and very little of the cost of manual handling.

The chief feature of the invention consists in the provision of a machine which is herein called a hacking machine for mechanically handling brick from that stage of the process in their manufacture where they are formed to that stage of the process where they are received by a receiver commonly called a dryer car, or in that stage in a certain brick process, known as the soft mud process where the brick are produced upon pallets received by the dryer and are at present manually handled between the dryer and the kiln.

Briefly, one sequence of operation of the unitary hacking machine is as follows: Brick are supplied usually by a constantly moving belt and the belt supports said brick in stream formation, the brick in each stream being separated or spaced from each other, generally, with regular spacing but not necessarily so. The belt may simultaneously support one or more streams of brick which may or may not be arranged in complete transverse rows. The dryer car is a car adapted to receive a plurality of layers of brick positioned thereon in predetermined relation, and generally the brick in each layer have a predetermined positioning with respect to each other and the brick in each layer have a predetermined positioning with respect to the brick of adjacent layers. Commonly, such last mentioned predetermined relation consists of positioning the brick in alternate courses or layers transversely of each other. The hacking machine is adapted to automatically take enough brick from the belt to complete or substantially complete, the entire layer or a predetermined portion of the layer of brick in the dryer car. The brick, however presented to the machine, are automatically positioned in predetermined relation to each other by the machine before deposition. This action is called segregation. After segregation the brick are automatically deposited on the dryer car in the desired relation with respect to other brick thereon. Following the automatic deposition of the brick in the dryer car the machine automatically returns to its initial position adjacent the belt for another load of brick. The parts of the machine are so arranged that the device is substantially automatic in its operation, that is, in the sequence of steps through which the brick are passed. The machine is so constructed that the omission of one or a few brick from the machine in any layer of brick does not interfere with the brick upon the belt to be immediately handled by the machine, nor does it interfere with any of the automatic operations. It is to be understood that any of the motions described as automatically controlled, either initiated or stopped, or both, may be manually initiated, stopped or controlled as desired without in any way departing from the broad disclosure of the invention.

With relatively slow belt speeds one hacking machine can handle all of the brick on the belt. With high belt speed, the time element is such that it is preferable to employ a plurality of hacking machines successively positioned along the belt. While one hacking machine is filling the other may be segregating, depositing and returning. When more than two machines are employed one may be segregating, another depositing and another returning, while a fourth is filling. Various combinations determinable by the particular plant equipment and operation will determine the number of hacking machines utilized with each belt. The plant requirements will also determine what particular type of hacking will be performed by the machine.

The construction and control are such that when the machine is placed in the proper position for filling with brick, the brick pass through the machine without being engaged until a master control is operated. By actuation of the master control, either manually or automatically, certain parts of the machine are placed in position for brick engagement. Upon brick engagement filling of the machine is automatically initiated and each step of the filling is thenceforward automatically initiated by brick engagement with some part of the machine. The filling or substantially complete filling of the machine with brick automatically initiates the remaining series of operations as before indicated until the machine is again automatically repositioned in the initial position, whereupon the master control is again actuated. The master control may be actuated either manually or automatically. The automatic operation of the master control is employed where two or more hacking machines are used with the same belt, the hacking machines being interconnected so that the filling of one machine to a predetermined point will automatically initiate the filling of another machine.

In the following the terminology "brick", includes a brick or a brick unit, the latter comprising a plurality of contacting brick arranged in unit formation for simultaneous handling, which unit formation usually is maintained until after firing. By the terminology "individually" picking up "brick", is meant the individual picking up of a brick or brick unit as defined above.

Brick in the following specification and claims is not only intended to include a brick or brick unit, but to include similar articles particularly plastic articles such as terra cotta tiles and other tiles.

Figure 4:
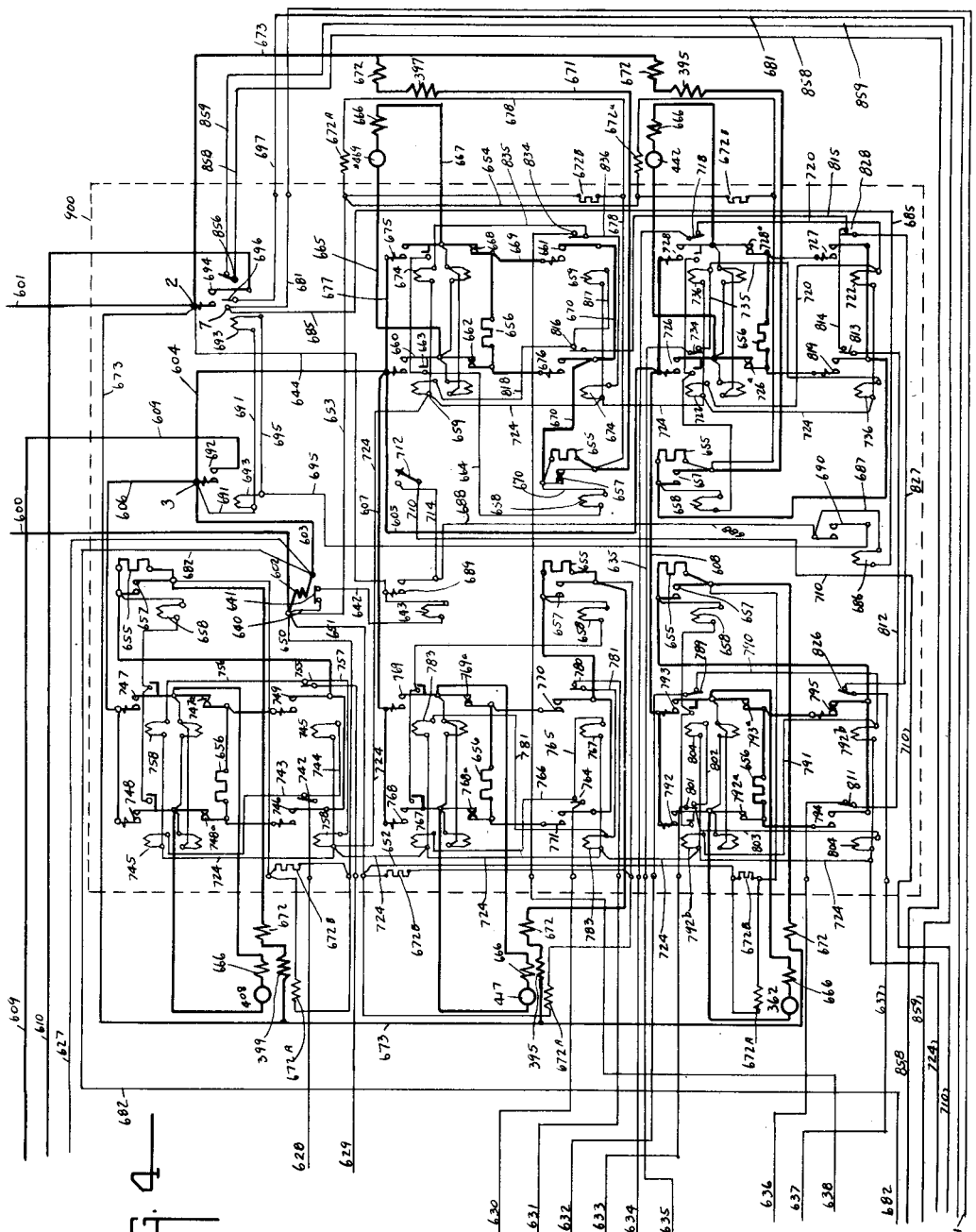
Figure 5:
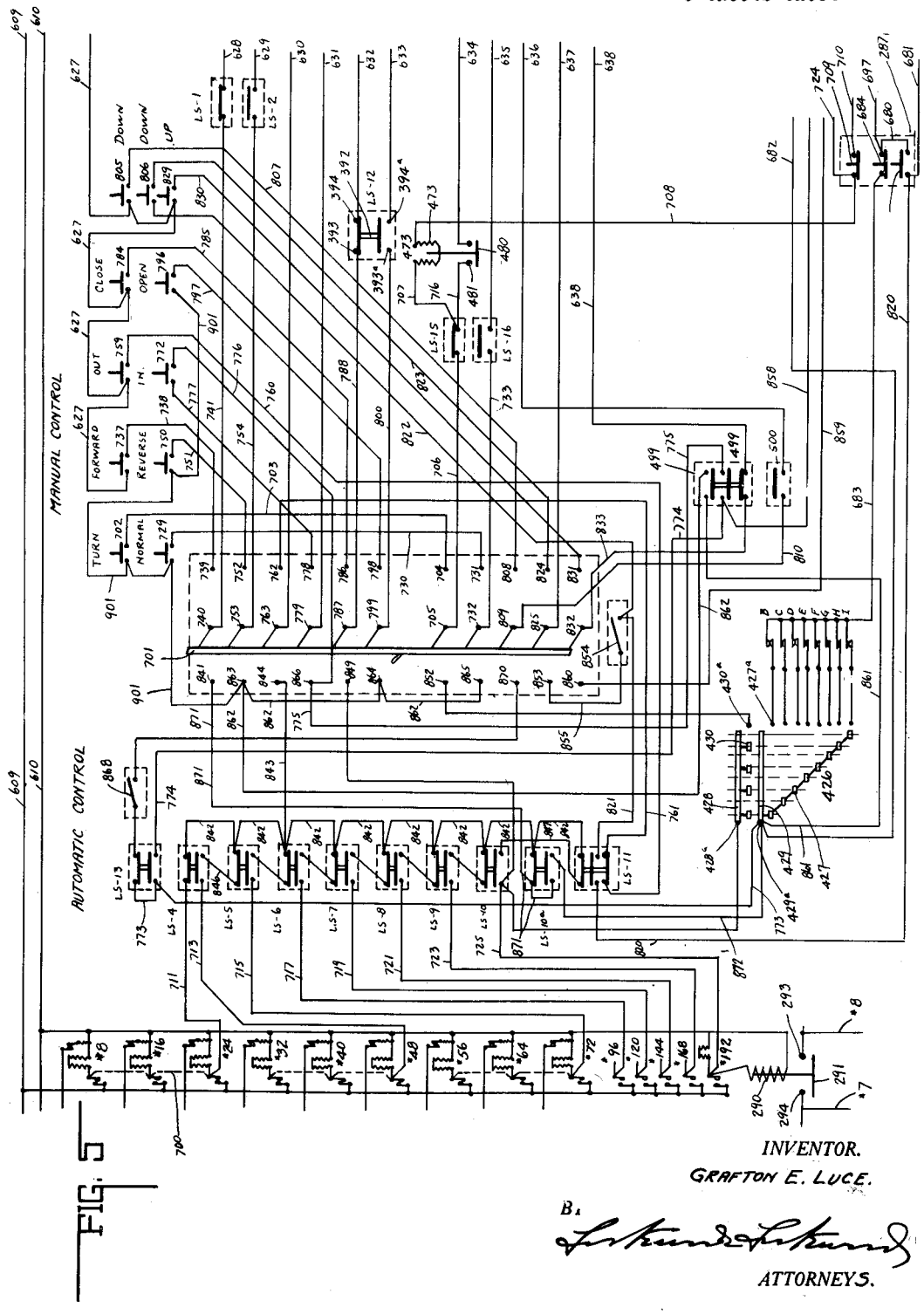
Figure 6:
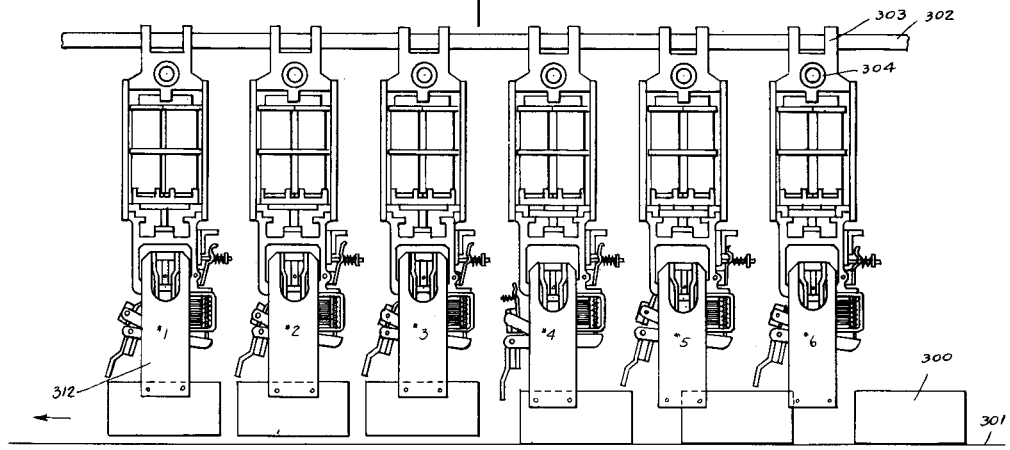
Figure 7:
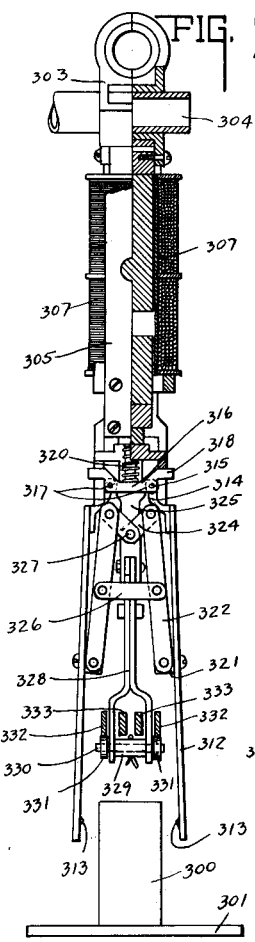
Figure 8:
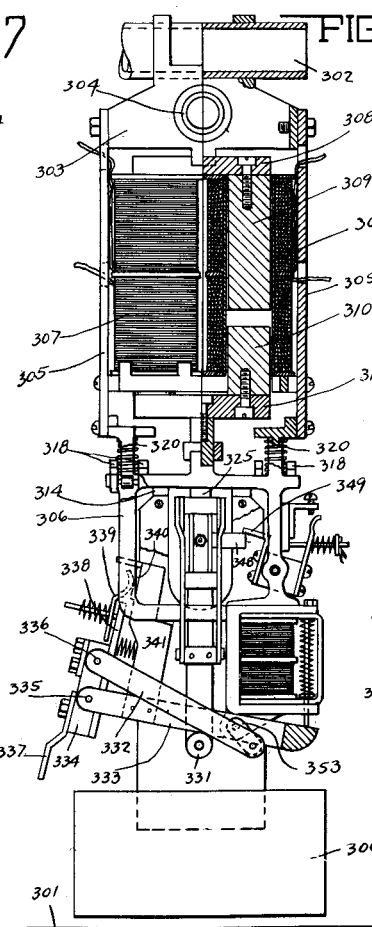
Figure 9:
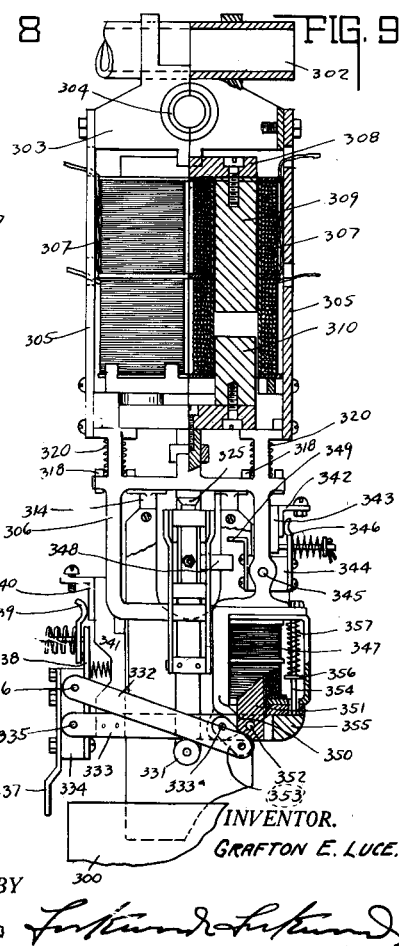
Figure 10:
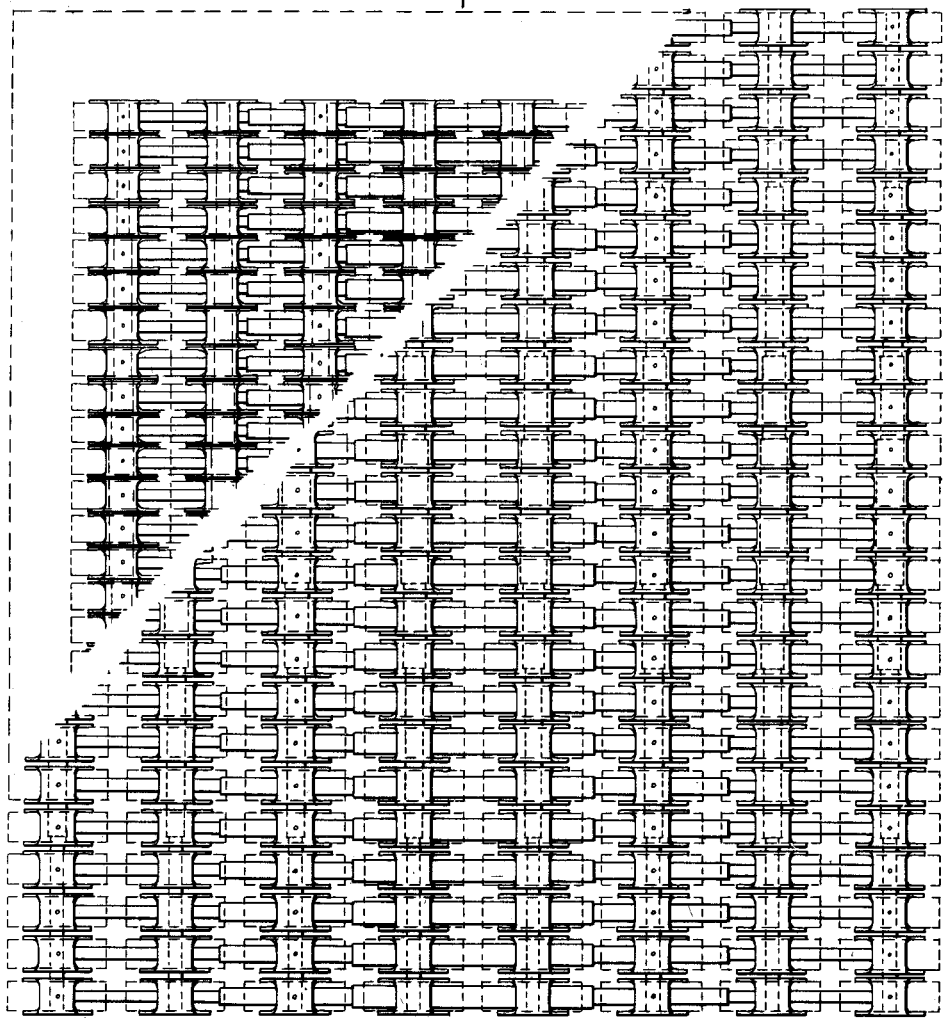
Figure 11:
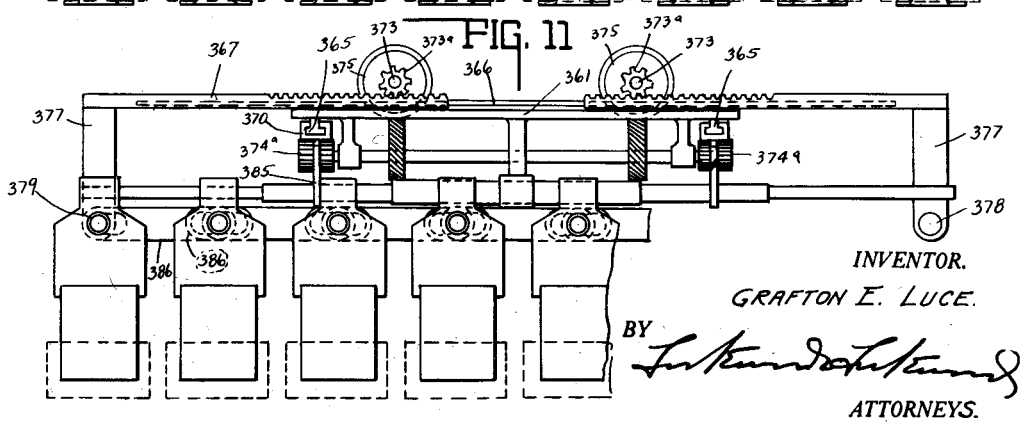

The full nature of the invention will be understood from the accompanying drawings and the following description and claims:

In the drawings Fig. 1 is a diagrammatic plan view of an off-bearing belt, a plurality of dryer cars and a plurality of hacking machines, the machines being inter-connected for automatic control. Fig. 2 is a wiring diagram of 192 brick grasping and lifting devices arranged in tandem and transverse row formation of 24 rows of 8 each with their inter-controls for automatic operation and for the automatic initiation of other subsequent operations. Fig. 3 is a diagram of wiring connections and is a continuation of Fig. 2 and of the inter-control between the several parts of the machine whereby the automatic and predetermined sequence of operations is obtained. Fig. 4 is a continuation of the wiring diagram shown in Figs. 2 and 3 and is of the motor automatic controls and of the initiation control for the entire machine. Fig. 5 is a wiring diagram corresponding to Fig. 3 and of a modified form of control whereby a slightly different sequence of operation is secured. Fig. 6 is a side elevational view of a plurality of brick lifting and grasping devices, tandem arranged, with some of the parts in the brick elevated position, another preparatory to elevating and still others in the inoperative position. Fig. 7 is an end elevational view with parts in central section of one form of brick grasping and lifting devices. Fig. 8 is an enlarged side elevational view with parts in central section of a brick grasping and lifting device with parts in the brick elevated position. Fig. 9 is a similar device in position immediately preceding grasping, the parts being arranged for automatic operation. Fig. 10 is a top plan view of the segregator, the major portion of the figure showing the parts in the extended position and one corner of the figure showing the parts in the contracted position. Fig. 11 is a side elevational view of a plurality of brick lifting devices associated with the segregator, and shows the same in the extended position. Fig. 12 is a similar view of the same parts in the contracted position. Fig. 13 is a top plan view of the actuating and supporting mechanism of the segregator, the former being shown in the contracted relation, the outer dotted line of said figure indicating the extended position of the segregator, while the inner dotted line indicates the contracted position corresponding to the position of the parts shown in full line. Fig. 14 is a top plan view of a portion of the segregator device showing the same in the extended position corresponding to that shown in Fig. 11. Fig. 15 is a similar view of the same parts in the contracted or segregated position, and corresponding to that illustrated in Fig. 12. Fig. 16 is a top plan view of the trolley, and level selecting control crane. Fig. 17 is a side elevational view of the same, parts being shown in section to show other parts in detail. Fig. 18 is a central sectional view of one of the level selecting switches and the contactor associated therewith in one position, the dotted lines indicating a second position obtainable in lowering movement. Fig. 19 is a similar view of the same parts showing the same in another position while being elevated.

The several parts of the hacking machine are described, illustrated and claimed per se and without the inter-control in the following copending applications: "Brick lifter", filed August 1, 1925, Serial No. 47,515, "Segregator", filed July 14, 1925, Serial No.

726,032, and "Automatic crane", filed November 14, 1924, Serial No. 749,929. For a clear understanding of the interaction of the several parts and the inter-controls associated therewith, a substantial duplication of the subject matter of the before mentioned applications is given hereinafter.

Brick lifter.

The brick grasping and lifting mechanism in its preferred form is shown in Figs. 6 to 9 inclusive. Fig. 6 illustrates a plurality of lifters upon a common support positioned immediately over a belt carrying brick in spaced relation and which is positioned beneath the lifter so as to pass the brick through the lifter, the latter straddling the brick.

In the drawings 300 indicates a brick unit or brick carried by a belt 301 commonly called an off-bearing belt, or other suitable movable support. These brick are formed by a brick making machine and are removed from said machine by the off-bearing belt. Various other types of removal and formation may be employed, but the invention depends upon the relative movement of the brick and the brick lifting devices for controlling the operation of the latter. A tubular shaft 302 constitutes a support which slidably supports a plurality of brick lifting devices in tandem relation. The hanger for each brick lifting device is hereinafter termed the saddle and is indicated by the numeral 303. Slidably associated with the saddle 303 and upon an axis transverse to the shaft axis 302 is a shaft 304. As hereinafter pointed out this shaft 304 is associated with a plurality of brick lifting devices arranged in transverse row formation, whereas shaft 302 is associated with brick lifting devices arranged in tandem row relation.

The details of each brick lifting device, that is, the preferred form of the invention, is shown clearly in Figs. 7 to 9 inclusive. In these figures the support framework includes a pair of straps or side members 305 depending from the saddle 303 and depending from said sides is a cradle construction 306 on which is movably mounted the brick grasping and lifting mechanism. Mounted within the aforesaid framework between the cradle and the saddle is a fluid operable power unit consisting of a pair of solenoids each including an upper and lower coil, said coils being in aligned relation and indicated by the numeral 307. A common armature 308 is stationarily associated with cores 309. In aligned relation with cores 309 is another core 310 which is slidably supported within the coil. Slidably supported cores 310 are connected by a movable armature 311. The magnetic path of the solenoid construction, therefore, includes the armature 308 and 311 and the cores 309 and 310. Current supplied to the coils 307 will build up the magnetic field in the resultant construction and cause the armature 311 with the cores to move upwardly from the position shown in Fig. 7 to the position shown in Fig. 8. The amount of reciprocatory movement of the armature and cores is predetermined and naturally can be adjusted. As shown clearly in Fig 9 the upper end of the cradle 306 supports the movable armature and cores when in the lowered position.

The brick grasping mechanism consists of a pair of plates 312 which may or may not be provided on their adjacent and inner faces with small projections 313. The plates 312 are hingedly supported through a hinge member 314 rigid therewith which is pivotally supported on pin 315 carried by a combination pivotal support and spring retainer 316. A roller 317 is adapted to roll along the side of the cradle 306 and thus insure aligned movement of the hinge member. As shown clearly in Figs. 7 and 8, a pair of spring retainers 316 are provided and the ends thereof are bifurcated as at 318 and straddle the cradle framework 306 and align the movable mechanism associated therewith. The spring 320 is interposed between the cradle and the movable spring retainer 316 forming the support for the hinge members 314 and serves to normally maintain the members 316 and all of the mechanism supported thereby in the lower position.

Intermediate the ends of each of the plates and centrally positioned is a pivot supporting block 321. Pivotally supported on said block 321 is a link 322, the upper end of which is pivotally connected by a link 324 to a draw-bar 325. A transverse link 326 is pivotally connected at each end to a pair of the links 322. The draw-bar 325 has a detachable and adjustable connection with the movable armature 311. Thus, reciprocatory movement of the armature through the draw-bar will elevate and lower the hinge pin 327 connecting the two links 324 each connected to the free end of the links 322, the other end of which is pivotally connected to a plate 312. An upward pull on the draw-bar will serve to elevate the two links 324 and tend to throw the pivots and therefore the upper ends of links 322 outwardly and away from each other. Because the two links 322 are connected by a spacing link 326, this movement serves to draw the clamping plates 312 towards each other and thus grasp the article. This inward movement of the plates continues until such time as the plates have grasped the article with just sufficient force to permit of its being lifted. Continued upward movement of the draw-bar, therefore, will elevate the plates 312 with links 322, 324 and 326, said upward movement being in opposition to the springs 320 and continuing to the point determined by the seating of the armature in closed relation. The foregoing constitutes the simplified brick grasping and lifting device.

Each brick lifting device includes a pair of yoke forming straps 328 which are connected at their upper end to the draw-bar 325 and at their lower end are spaced by a sleeve or bushing 329, said bushing being carried by a pin 330 upon the outer and projecting ends of which are mounted rollers 331. These rollers 331 slidably support a pair of links 332, one end of each of which is pivotally connected to a link 353 which link is in turn pivotally connected to the frame 306 at 333ª. Within the pair of links 332 and within the yoke construction, is another pair of links 333, pivotally supported by the frame 306 at 333ª. A switch contact support 334 is preferably in the form of insulation and is pivotally supported at 335 and 336 in the free ends of the pairs of links 332 and 333, respectively. The insulation block 334 supports a trigger 337 adapted to be engaged by the brick 300, which engagement tilts said insulation block and causes the contact plate 338, yieldingly mounting the contact finger 339, to engage the relatively stationarily mounted contact plate 340 carried by the insulation block 341, in turn stationarily mounted upon links 333. Thus, tilting of the block by reason of the trigger engaging the brick causes the contact finger 339 to engage stationary contact switch 340 and this switch is the control for the solenoids 307. When current is supplied through said switch to the solenoids it immediately elevates the draw-bar and causes the draw-bar to tilt the entire switch mechanism into the positions shown in Fig. 8. These positions are also shown in the first three left hand devices illustrated in Fig. 6.

Stationarily supported by the cradle 306 is a back contact 342 insulated from the same by a block 343. An insulation block 344 is pivotally mounted at 345 upon the cradle 306 and carries a switch contact finger yieldingly mounted at 346. Said switch contact finger 346 is normally maintained in engagement with contact member 342 and this is a control switch for an auxiliary solenoid 347. The draw-bar construction 325 carries a stop or trigger 348 which in the upward movement of the draw-bar is adapted to engage a bracket or projecting finger 349 and tilt the switch block 343 upon its pivot 345, and thus open the circuit at the switch 342—346.

Stationarily mounted by the cradle 306 is a solenoid frame 350 which encloses the auxiliary solenoid 347. When this solenoid is energized it raises the core 351 pivotally supported at 352 by the links 333. This movement tends to throw downwardly into brick engageable position the contact or trigger 337 for brick engagement and the closure of the switch 339—340 controlling the solenoids 307.

Adjacent to solenoid 347 is a plunger rod 354 adapted to engage a transverse connector 355 carried by the free ends of the links 333, and said rod 354 includes a spring retainer 356 between which, and the solenoid support 350, is interposed a spring 357. This spring acting through said plunger normally maintains the trigger mechanism in the non-engaging position when solenoids 307 and 347 are both deenergized.

The sequence of operation is as follows: Coil 347 is manually or automatically actuated, which projects and drops downwardly into brick engageable position the contact or trigger 337. Immediately upon brick engagement the switch 339—340 carried by the block 334 is closed, which energizes solenoid 307. This elevates the draw-bar, causes the clamping plates to clamp the brick and then the remainder of the application of the solenoid force is applied to elevational movement in opposition to springs 320. The substitution of springs of different strength will regulate the force actually applied for grasping, and if desired springs 320 may be entirely omitted, in which event gravity will cause the parts to operate as if springs were utilized provided the weight of the several parts is adjusted to give the desired grasping force. As the draw-bar moves upwardly the stop 348 engages bracket or finger 349 and opens the switch 342—346 previously closed. Simultaneously therewith the draw-bar elevates and tilts the switch 339—340 into the position shown in Fig. 8, the pressure of the draw-bar on links 332 through rollers 331 maintaining the switch in closed position. Breaking the contact at 342—346 deenergizes the auxiliary solenoid 347 which allows the elevating and tilting of the switch 339—340 to be accomplished without the necessity of opposing the pull of said solenoid. When the solenoids 307 are deenergized, the brick are dropped and the plates and linkages returned by gravity and the action of springs 320 and 357 to their original position, that is, with the plates lowered, separated and straddling the path of the brick and the trigger 337 in the non-engaging position above the path of the brick. When the auxiliary solenoid is again energized the trigger is again placed in the path of the brick and upon brick engagement the cycle is repeated.

In the operation of a tandem row of brick lifters such as shown in Fig. 6, the auxiliary solenoid of brick lifter number 1 is energized by a manually or automatically operated master control to place the trigger of this lifter in the path of the brick. Closing of the switch 339—340 of this lifter by brick engagement not only actuates the lifting solenoid for grasping and elevating brick but actuates the auxiliary solenoid of lifter number 2 to place the trigger of that lifter in the path of the next succeeding brick. Upon brick engagement of lifter number 2 the trigger of number 3 is placed. In this manner the lifters in the row are successively filled.

In Fig. 2 is illustrated the wiring of a unit of 192 brick lifters arranged in tandem and transverse rows, with the inter-connections between brick lifters the details of which are subsequently described under the head "Brick lifter control wiring".

Segregator.

In Figs. 12 and 13 a reinforced collar 360 is associated with a rectangular framework 361 and mounted thereon is a motor 362 having the driving shaft 363 and spiral driving gear 364. The rectangular framework 361 is provided upon two opposite and parallel edges with two T-shaped depending guides 365, and upon its upper surface and upon adjacent and parallel edges with a pair of T-shaped guides 366. See Figs. 11, 12 and 13. Slidably supported upon each of the T-shaped upwardly extending projecting or guide members 366, is a pair of outwardly extensible arms 367 having the T-shaped groove 368 therein for engagement with the T-shaped projections 366. The upper surface of the arm 367 is toothed as at 369 to provide a rack. Other arms 370 are provided with T-shaped slots 371 for receiving the suspending T-shaped guide and support 365 previously described. The lower face of each of the slotted arms 370 are also toothed as at 372.

In suitable supporting brackets carried by the rectangular framework 361, there is rotatably mounted parallel shafting 373 and other parallel shafting 374, said shaftings being at right angles to each other and lying in superposed planes. Shafting 373 includes a plurality of spiral gears 375, one of which meshes with the driving spiral gear or pinion 364 driven by motor 362. Each spiral gear 375 meshes with a spiral gear 376 carried by one of the shafts 374. Each shaft 373 includes at each end a pinion 373ª and each shaft 374 includes at each end a pinion 374ª, which pinions mesh with the toothed portions of the arms 367 and 370 respectively. The resultant construction is a closed spiral gear drive, power operable by the motor 362 for the extension and contraction of the arms 367 and 370. Whenever motor 362 is energized the power is transmitted through the gearing and will either simultaneously retract the transversely positioned arms 367 and 370 or will simultaneously extend the same. Each of the arms 367 terminates in a depending bracket member 377 provided with an opening 378.

A tubular shaft 380 (see Figs. 11 and 13,) supports a pair of tubular extensions 381 each of which include similar extensions 379 terminating in the shafting 382, said tubular shafting being extensible and contractable axially. The depending arms 377 having the openings 378 receive sleeve shafts 379. The foregoing construction is such that the telescopically sectionalized shafting is associated with the pair of projecting arms 367, so that a pair of said telescopically sectionalized shafts are caused to move inwardly and outwardly towards and away from each other, respectively, in parallel and spaced relation and simultaneously.

A similar sleeve shaft 383 includes the telescopically associated sleeves 384 which also support the shafting extensions 385. The sleeves 384 are mounted in openings 378 carried by depending supports 377 in turn suspended from the projecting arms 370. Thus, each telescopically associated shaft 383, 384 and 385 is associated with a pair of parallel rack supports and a pair of said constructions are caused to move inwardly and outwardly towards and away from each other, respectively, in spaced and parallel relation. Herein the arrangement is such that the two sets of shafts are simultaneously movable inwardly or outwardly and are positioned transversely of each other at all times.

The shafting is shown tubular for convenience only. The sectionalizing is required where the length of the fingers is insufficient to position the brick without considerable dropping in the car with the segregator remaining above the dryer car. Thus the shafting and segregator framework can be received within the dryer car by sectionalizing the shafting.

It will be recalled, each of the saddles of the brick lifting devices indicated in Figs. 6 to 9, indicated by the numeral 303, includes a pair of transverse bearings. In the before mentioned figures the numerals 302 and 304 indicate the tubular shafting herein indicated by the several numerals 379 to 385 inclusive, respectively. The segregator construction includes eight parallel positioned shaftings 379 to 382, inclusive, and twenty-four parallel positioned shaftings 383 to 385, inclusive, that is, there is provided one hundred ninety-two brick clamping devices arranged in rows of eight each in tandem relation and in twenty-four transverse rows. The foregoing eight by twenty-four arrangement, in the case of brick, permits eight brick to be positioned in tandem and abuttable relation as shown by the dotted lines in Fig. 12, and twenty-four rows of such abutted brick to be positioned in spaced relation suitably separated by at least the width of the finger. The last mentioned arrangement is shown clearly by the upper left-hand corner of Fig. 10. The extended relation is shown by the lower right-hand corner of Fig. 10. It is not essential that the movement in two transverse directions, even though simultaneous, be equal but the mechanism is such that said movement may be equal.

The means for insuring accurate spacing include suitable linkage and reference is now had particularly to Figs. 11, 12, 14 and 15. The links 386 are associated with the ends of the shafting 382. The distance between the openings in each link constitute the mechanism clearance distance between said shaftings in the contracted or telescopic position. The distance from the farthest point on the elongated slots of the link constitutes the maximum spacing distance between said shaftings. Similarly, links 387 are associated with the ends of the shafts 385 and said links are similarly formed and have the same limiting factors. It will be apparent that the two types of links need not necessarily be of the same length and as shown in Figs. 14 and 15 are not of the same length. Furthermore, the openings need not be of the same diameter, for, as shown in Fig. 14, the size of the shaft does and may vary. It is only necessary to provide two transverse sets of linkages but for equal movement two parallel sets are utilized, and these are associated with the outer ends of the several shafts. When the shafting is in the contracted or telescopic position the linkages are in their collapsed position. It will be apparent that adjacent links are alternately offset from each other. When the shafting is extended the links are extended and limit the extreme movement of the several shafts. By the foregoing construction the position of each brick engaging unit is equally determined in the extended and contracted position which are the two essential positions.

In Fig. 13 there is illustrated a travel limit switch designated LS 12 used as control for the reversible motor 362. Herein said limit switch consists of a suitable gear 389 which meshes with the gear 390 carried by the threaded shaft 391. The threaded shaft 391 carries a collar 392 and this collar is adapted to movement to and fro on the shaft thru the rotation thereof. A pair of switches include movable contacts 393 and 393ª and stationary contacts 394 and 394ª. The collar 392 is adapted to alternately engage one or the other of the movable contacts in its reciprocatory movement and open the circuit through the switch at the end of its reciprocatory movement in one direction, which automatically will stop the motor 362 at that point but will permit the circuit to be closed thru the motor in the reverse direction when other suitable controls are actuated. Thereupon when so actuated current is supplied to the motor for reverse rotation, which reverses the travel of the block 392 permitting the switch heretofore open to close making ready for the reverse movement and continuing the motor movement until such time as the block or contact 392 engages the other movable contact to open the switch therethrough and stop the motor. The foregoing constitutes the automatic travel limit and reverse switch mechanism provided for the segregator motor. This motor also is provided with dynamic braking and if desired, may include a solenoid brake.

Crane.

Means are provided for positioning the segregator and brick lifters for brick engagement and for deposition of brick on the dryer car. Such a means includes a suitable movable support which is hereinafter termed the crane, which movably supports a trolley. The crane and trolley are capable through switch control means of a step by step movement for successively presenting unfilled brick lifting devices to brick supplied in stream formation by the off-bearing belt. Such a construction is shown diagrammatically in Fig. 1 and in detail in Figs. 16 and 17; while Figs. 18 and 19 in addition to 16 and 17, illustrate suitable controls for the crane construction. In said figures 400 indicates a pair of crane supporting tracks illustrated as channels and shown supporting a crane or movable framework which includes a plurality of flanged wheels 401 supported by said track-ways. These wheels are connected by shafts 402 which are rotatably supported by the outwardly projecting bracket portion 403 included in the framework members 404. Said members 404 connected by transverse members 405, constitute the remainder of the open rectangular framework. The members 405 are so formed that they constitute a trolley track-way and are substantially transverse to the crane track-way. Suitable stops 406 are associated with the track-ways 405 for limiting the travel of the trolley thereon.

Upon a base plate 407 is mounted an electric motor 408 and herein termed the crane motor. This includes a driving pinion 409 meshing with a driving gear 410, which rotates shaft 411 supporting a worm 412 which meshes with a worm wheel 413 carried by one of the shafts 402. Forward and reverse rotation, respectively, of the motor 408 will cause forward and reverse movement of the entire crane construction upon the crane track-ways 400. Forward and reverse movement of the crane upon the track-way may be continuous or intermittent, or step by step, or any combination thereof. Motor 408 includes a solenoid brake 399 which together with dynamic braking, secures substantially instantaneous stoppage of the crane in any desired position through the use of travel limit switches, the particular location of which is hereinafter to be described. For one form of movement preferred, reference will be had to the control description to be given hereinafter. The trolley 414 is provided with a pair of axles 415 that extend transversely of the shaft 402 and said axles support flanged wheels 416 which roll upon trolley trackways 405. The trolley 414 supports a motor 417, the shaft 418 of which carries a worm 419 meshing with a worm wheel 420 carried by one of the shafts 415. The solenoid brake 398 is also associated therewith. Thus the trolley is caused to reciprocate on the crane at right angles to the crane movement as desired. In addition to the solenoid brake, dynamic braking is also employed on motor 417.

The trolley 414 is herein shown provided with a central aperture 431 defined by a collar 432, which includes a bushing 433 for rotatably supporting a hub 434 carried by turn table 435. Turn table 435 at its outer periphery is provided with inclined teeth 436 which form a bevel gear. A bevel pinion 437 is carried by shaft 438 in brackets 439 upon the table 414. A worm wheel 396 upon the shaft 438 meshes with a worm 440 carried by shaft 441. This shaft is driven by the quarter turn motor 442 supported upon the table 414. The motor also is provided, in addition to dynamic braking, with a solenoid brake 395. Interposed between the turn table 436 and the trolley 414, is a suitable anti-friction construction herein shown in the form of an annular ball race 443. Positioned within the central opening 431 is a stem 452 which is rigid with the collar 360 supporting the rectangular segregator framework. This stem 452 is threaded but is slidably supported in the central aperture 453 formed in the turn table 435. The stem 452 includes a keyway 454 and the hub 434 of the turn table 435 includes a complementary key-way 455. These receive a locking key 456 which prevents relative rotation of the stem 452 and the turn table 435. Therefore, rotation of the turn table by means of the quarter turn motor 442 also rotates the stem 452 and the segregator support 360.

The turn table 435 mounts a projecting tongue or latch 470 having the tapered faces 471. In bracket 472 on trolley 414 is mounted solenoid 473, the core 474 of which carries on its free end a plunger 475, which has tapered faces 476, and a wedge shaped notch or socket 477 adapted to receive the locking projection 470. Spring 478 yieldingly retains said plunger or catch in latch retaining position and thus locks the turn table and consequently the segregator support in a predetermined position. Plunger 475 carries an insulation support 479 which carries a bridging contact 480 adapted to bridge a pair of contacts 481. These contacts 481 are in the control for forward or cross turning movement of the quarter turn motor. Thus until the solenoid 473 has been actuated to retract the plunger 475 the switch 480—481 will remain open and the motor will not be energized. When the plunger is retracted the switch will be closed to energize the motor 442 and rotate the turn table 435. There may be included a pick up and maintaining relay arrangement so that the solenoid 473 may be deenergized and permit opening of switch 480—481 and yet permit the quarter turn motor to rotate the turn table 435. This latch mechanism is necessary only when the motion of the turn table is to be so rapid that the ordinary solenoid brake and dynamic brake fail to stop the turn table at the proper position at the end of each cycle.

Rotatably mounted on turn table 435 is a bevel gear 460 having a threaded central aperture 461 which has threaded engagement with the threaded stem 452. The gear 460 is supported on the turn table 435 by an anti-friction support or ball race 462. Meshing with the gear 460 is a bevel pinion 463 carried by a shaft 464, in turn supported by brackets 465 upon the turn table 435. A worm wheel 466 upon said shaft is actuated by a worm 467 upon a motor shaft 468, operable by a reversible raising and lowering motor 469. The shaft 468 also carries a solenoid brake 397. When the motor 469 is energized it causes rotation of gear 460 in the proper direction to secure raising or lowering of the stem 452 and the segregator support 360. Since the stem 452 is keyed to the turn table 435 as before described, the raising and lowering is not accompanied by relative rotation of the segregator and the turn table.

The gear 460 also serves as a support for the stem 452 and the entire segregating and brick lifting mechanism since the pitch of the threads is made such that the action of gravity is not sufficient to run the gear backward and lower the stem without help from the raising and lowering motor.

*Level selectors and rotary limit switch.*

In the normal operation of the machine, it is required that at certain times the segregator support 360 be positioned at predetermined levels for depositing brick on the drier car. For this purpose there is provided an upright 492 upon which are mounted a plurality of level selecting switches, LS B, LS C, LS D, LS E, LS F, LS G, LS H and LS I. See Figs. 17, 18 and 19. These level selecting switches have projecting triggers 496. A collar 485 is carried by the threaded stem 452, and a pair of side portions 484 project therefrom. Pivotally supported thereby is a tripping member 486, engageable upon triggers 496 for opening the level selecting switches.

Side portions 484 are connected by transverse portions 489 and an adjustable stop 490 is carried thereby which is engageable by a projecting portion 491 upon the tripping member 486. Thus, in the upward movement of the collar 485 by reason of the rising of the threaded stem 452, the tilting movement of the tripping member is limited as shown in Fig. 19 to clearance of the triggers 496. The tripping member 486 carries a member 487 which abuts an adjustable mounted screw 488 carried by the collar 485. Member 487 also acts as a counterweight and insures that the normal position of the tripping member is as shown in Fig. 18.

The switch mechanism associated with the trigger 496 consists of a contact 493 carried by the support 492 and engageable by a yieldingly mounted contact 494 pivotally supported at 497. A spring 495 normally maintains contact or trigger 496 in the horizontal position abutting a stop 496ᵃ carried by the support 492 and in this position the switch contact 494 engages switch contact 493. Insulation blocks 497ᵃ and 493ᵃ insulate the two contacts from the remainder of the machine.

In the lowering movement of the threaded stem 452, the tripper 486 engages trigger 496 and opens the circuit across the switch points 493—494. In the elevational movement the tripper 486 is tilted out of the way and the switches remain in the normally closed position. The eight projecting triggers 496 shown in Fig. 17, are each associated with a switch and it is apparent that if the current for energizing the lowering of the raising and lowering motor is passed through any one of said switches that the lowering motion will be stopped as soon as the tripper 486 reaches the proper level to break the contact at that particular switch. In order to stop the lowering motion at the desired level, it is only necessary to send the current controlling the lowering motor through the proper level selecting switch.

The actuation of the active level selector switch is accomplished by means of the rotary controller 426 shown in detail in Figs. 3, 5, 16 and 17. This switch consists of a rotatable insulation drum 426ᵃ upon which is mounted a plurality of electrically connected contacts 427 arranged around the drum in offset relation and equal in number to the number of level selector switches 493—494 and a continuous contact 429 which extends around the drum and is electrically connected to contacts 427. Bearing upon the drum and insulated from each other and from the remainder of the machine is a series of brushes 427ᵃ for individual engagement with a contact 427 and a brush 429ᵃ for the continuous contact 429. Each of the brushes 427ᵃ corresponding to one of the contacts 427 is connected to the contact 494 on one of the level selecting switches. The brush 429ᵃ corresponding to the continuous contact 429 is connected into the main control line for the lowering motor as is hereinafter described. It is apparent from the foregoing description that for any position of the rotating drum 426ᵃ one and only one of the brushes 427ᵃ will be in contact with a contact 427 and the circuit only can be made through that particular brush and its corresponding level selector switch. To select the proper level it is necessary to have the proper brush engage its contact 427 either by hand or by automatic means.

In Figs. 16 and 17 is shown a means for automatic setting of the rotary limit switch consisting of an overhanging arm 421 carried by trolley 414 and pivotally supporting a pawl or tooth 422 adapted to engage a star wheel 423 mounted on the shaft 424 which also carries the rotating drum 426ᵃ of the rotary controller. The said shaft is supported from one of the crane members 404 by the brackets 425. In each return movement of the trolley the star wheel 423 will be actuated by the pawl 422 thereby moving the rotating drum 426ᵃ a predetermined portion of a revolution. Since pawl 422 is free to pivot from its normal position in one direction the star wheel has unidirectional rotation only. Herein eight points are shown on the star wheel corresponding to eight brushes 427ᵃ and eight level selecting switches, and therefore, the drum 426ᵃ is moved through an eighth of a revolution for each return of the trolley. In this manner eight successive courses of brick are set on the dryer car and on the ninth return of the trolley the first or lowest level is set to commence the filling of an empty car.

The rotary controller 426 also carries on its drum 426ᵃ another continuous contactor 428, having a brush 428ᵃ associated therewith. Also mounted on said drum is a series of segmental contacts 430 having a brush 430ᵃ associated therewith. The contacts 430 are each electrically connected to the contact 428. The brushes 428ᵃ and 430ᵃ are included in the circuit for controlling the quarter turn motor as hereinafter described. When the drum is in such position that brush 430ᵃ is in contact with one of the segmental contacts 430 the circuit may be completed and a quarter turn will take place at the proper point in the cycle of operations. In Figs. 3 and 5 one contact 430 is shown for each alternate position of the drum 426. By this arrangement alternate courses of brick on the dryer car will be cross hacked. It will be apparent that by a different arrangement of the segmental contacts the first two courses might be cross hacked, the second two not, and so forth or any desired combination of cross hacking might be obtained.

*Travel limit switches.*

To control and limit the several travels of the several mechanisms included in the hacking machine a number of travel limit switches are used in addition to the level selectors, the rotary controller and the segregator limit switch previously described. These travel limit switches are shown particularly in Figs. 1 and 17 and suitably indicated in the wiring diagrams.

Fixedly and successively mounted along the crane trackway 400, see Fig. 1, is a plurality of travel limit switches designated LS 2, LS 17 to LS 23 inclusive, and LS 1. Each of said switches carries a projecting fork 298ª engageable by a trigger 298 carried by the crane. When the fork is engaged by the trigger passing in one direction, a circuit is completed within the limit switch; when passing in the opposite direction the circuit is broken. Certain of the switches include or control a plurality of circuits which may or may not be independent of each other. If independent they may be differentially controlled. The above switches are used to suitably limit and control the travel of the crane in the several operations of the hacking machine, said travel being termed "forward" and "reverse".

Fixedly and successively mounted along the trolley trackway 405 is a plurality of similar travel limit switches designated LS 13, LS 4 to LS 10 inclusive, LS 10ª and LS 11. Each of said switches carries a projecting fork 298ª engageable by a trigger 297 carried by the trolley 414. These switches with the exception of switch LS 10ª are used to limit and control the travel of the trolley, which travel is termed "out" or "in". In addition, switch LS 11 conditions circuits for both manual and automatic operation of the raising and lowering motor 469 for lowering and switch LS 13 conditions a circuit for automatic lowering. In addition, for certain types of automatic control, the switches LS 4 to LS 10 inclusive are used to control simultaneously the trolley and crane travels. In this case switch LS 10ª is a cut over switch for controlling the crane travel independently of the trolley travel at certain points in the automatic cycle.

Mounted on the trolley 414, see Fig. 1, are two similar travel limit switches designated LS 15 and LS 16 each of which carries a projecting fork 298ª engageable by triggers 296 and 295 respectively, which have a predetermined relationship and are carried by the turn table 435. These switches are used to limit the travel of the turn table which is termed "cross turn" and "normal turn".

Carried by the trolley 414 are two travel limit switches 499 and 500, see Fig. 17. Each of these switches carries a projecting fork 298ª engageable by the arcuate collar 498 carried by stem 452. The arcuate formation of the collar insures engagement of the respective forks by the collar independent of the oscillatory rotation of the stem 452. These switches are used in addition to the level selectors previously described for limiting the vertical travel of the stem 452, termed "up" and "down". In addition the switch 499 conditions circuits for both manual and automatic actuation of the trolley motor for travel toward the offbearing belt, for automatic actuation of the segregator motor for opening the segregator, for automatic actuation of the quarter turn motor for the normal turning of the turn table, and for automatic actuation of the reverse crane travel.

The number and locations of, and the circuits controlled by the travel limit switches as described above may be and are varied to obtain the sequence of operations desired. The inter-connection and two examples of the sequence of control of the several switches are hereinafter described.

*Operation.*

The foregoing completely describes the mechanical construction of one hacking machine except for the wiring. The combined operation of the several hacking machines and the electrical control circuits by which the exemplified operation is obtained is as follows:

Three hacking machines, see Fig. 1, on a common crane trackway are shown associated with a single offbearing belt 301 carrying a plurality of brick 300, herein shown arranged in transverse rows three brick to the row. These machines are shown inter-connected for automatic operation. There are also shown a plurality of dryer cars 299, one for each machine. Hacking machine No. 1 at the right in Fig. 1 is shown positioned over its dryer car with a course of brick in cross-hacked relation, that is, turned at 90 degrees to the position of the brick on the belt. Hacking machine No. 2 in the middle of Fig. 1 is shown partially filled and filling with brick. Hacking machine No. 3 is in the starting position ready to begin filling when the filling of number 2 is completed. In the usual sequence of operations machine No. 1 fills first. It then moves to the dryer car. The master control of No. 2 is actuated automatically by machine No. 1 to initiate the filling of No. 2. When hacking machine No. 2 is filled, the master control of machine No. 3 is similarly actuated. During the filling of No. 2 and No. 3 No. 1 has deposited its brick and returned to the start and filling position with the brick passing through between the plates of the brick lift-ers and with the brick engaging triggers in non-engageable position. When enough brick have passed through No. 1 machine to substantially complete the filling of hacking machine No. 3 the master control of hacking machine No. 1 is actuated automatically and the filling of hacking machine No. 1 is again initiated.

Herein each hacking machine is assumed to have 24 rows of brick lifters and since three streams of brick are presented on the belt there must be eight stages in the filling of the complete unit. The position of the segregator of machine No. 2 for each of the eight stages of filling is shown by dash lines designated ST-1, ST-2, ST-3 etc. to ST-8. At stage 1 the first three rows of brick lift-ers are filled. The machine then moves to the stage 2 position where the fourth, fifth and sixth rows of lifters are filled. This continues for the eight stages whereupon the machine moves into position over the dryer car. The divisibility of 24 by several common divisions results in a convenient convertible interchangeable construction with 24 rows.

Herein the motion from stage to stage is shown to be diagonal, the forward component being for the purpose of clearing the oncoming brick on the belt. The minimum amount of the forward travel necessarily depends on the speed of the offbearing belt and the spacing of the brick on the belt. For relatively slow belt speeds or wide brick spacing the forward travel is not necessary, and the stage to stage movement is lateral only. The two components of the diagonal movement may take place simultaneously or successively. Each dryer car is herein shown square, so that it may fit the dimensions of the same course of brick when cross hacked or when not cross hacked. It is possible, however, to place a square unit of brick on two dryer cars each of the dimension of half the square and positioned side by side. It is also possible for two hacking machines to deposit brick on one dryer car positioned between them. When two hacking machines alternately deposit on the same dryer car, one machine may deposit courses cross hacked, while the other will deposit them non-cross hacked. In this case any shape of car might be used, the segregators of the two hacking machines being built to fit the car in the position for which each is intended to deposit. It is also possible for two hacking machines to deposit brick on a single pair of half square dryer cars positioned side by side and between the hacking machines.

It is also possible for one hacking machine to fill a half of a course at each trip on a half square car. These and many other variations are possible and are included in this invention.

Brick lifter control wiring.

Fig. 2 diagrammatically shows the wiring of a mechanism including 192 brick lifters arranged in 24 tandem rows, 8 lifters to each row. Each lifter, as previously described, includes a pair of lifting solenoids 307, an auxiliary solenoid 347, a normally open switch 339—340 and a normally closed auxiliary switch 342—346.

A pair of mains 609 and 610 are energized by a circuit to be hereinafter described upon actuation of the master control of the hacking machine. From each of these mains a branch extends to each of the 192 lifters as shown. The auxiliary coils 347 of the first finger in each row are connected directly across these two lines through the auxiliary switch 342—346 and when these lines are energized the auxiliary coils are energized to place the trigger of the lifter in the path of the brick as previously described. Upon brick engagement switch 339—340 is closed and solenoids 307 are energized for brick lifting. At the same time the auxiliary solenoid 347 of the second finger in the row is energized through line 358 and its auxiliary switch 342—346 to drop the trigger of the second finger for brick engagement.

Where several streams of brick are simultaneously picked up electrical cross ties 700 are used between the lifters to be simultaneously operated, herein shown connected in groups of threes. These cross ties insure that all of auxiliary solenoids 347 in a transverse group of three will be actuated and their triggers placed for brick engagement upon the actuation for brick lifting of any one of the lifters in the preceding similar group of three. Therefore, if a brick is removed from the belt by accident or for inspection the next following brick will be caught by the intended lifter as if the preceding brick had not been removed. The lifter corresponding to the brick removed will be left vacant and the subsequent operation of the machine will not be interfered with in any way. The cross ties 700 also insure that all the lifters in a transverse group of three will be actuated for lifting even though one or more of the switches 339—340 fails to make contact through a coating of clay, mis-adjustment or any other cause, so long as one of the switches 339—340 in the group makes contact.

Multiple hacking machine control.

In the lower part of Fig. 1 is represented a master control push button for each of the three hacking machines together with the inter-connections for the automatic actuation of the master controls. Herein 287 represents a push button which energizes the lines 609 and 610 of hacking machine No. 1, for manually conditioning this machine for filling by making contact between a line 680 and a line 681 by a circuit to be hereinafter described. Similar push buttons 289 and 288 are similarly associated with hacking machines Nos. 2 and 3 respectively. Associated with the last brick lifter to be filled, No. 192, of hacking machine No. 1 is a relay 290 which is energized to close a switch 293—294 when the said brick lifter is actuated for lifting. The switch 293—294 short circuits the master control push button 289 of hacking machine No. 2 conditioning this machine for receiving brick.

By a similar relay 293—294 the last lifter to be filled in machine No. 2 conditions machine No. 3 for filling. By a similar relay a certain predetermined lifter of hacking machine No. 3 similarly conditions hacking machine No. 1 for filling. The particular lifter of machine No. 3 to be used is selected such that enough brick are left on the belt between machines Nos. 1 and 3 to substantially complete the filling of No. 3. If automatic actuation of the master control is not desired the same brick lifter in each machine may be used to ring a bell or give some other warning signal to the operator that it is time to actuate manually the master control.

Wiring diagram.

Figs. 2, 3 and 4 combined give the complete wiring diagram for one form of operation of the hacking machine. Lines terminating at the left in Fig. 3 connect to like numbered lines terminating at the right in Fig. 2. Lines terminating at the right in Fig. 3 connect to like numbered lines terminating at the left in Fig. 4.

Fig. 5 is a diagram of a modification of that portion of circuits of the entire wiring diagram shown in Fig. 3. Figs. 2, 5 and 4 combined in the order named illustrate the complete wiring diagram of a modified form of operation of the hacking machine.

Master control circuits.

Associated with each hacking machine is a panel board on which is mounted all of the electrical apparatus inclosed within a dash line 900 in Fig. 4. A main supply line 600 and a main return line 601 supply direct current to the electrical apparatus from a suitable generator. Current from line 600 first passes through an overload relay 602. From the live side of the overload relay leads a line 640 connected through a normally closed bridging bar 641 operable by the overload relay, and through a line 642 to a solenoid 643 having its opposite side connected through a line 644 to the main return line 601. Solenoid 643 when energized maintains a normally open control relay 689 in the closed position. As will be hereinafter shown all of the motor control circuits and the master control circuit for the brick lifters pass through the control relay 689. This serves as overload protection for the entire hacking machine circuits except the motor shunt fields.

In Figs. 3 and 5 is shown the master control push button 287 previously described and which may be connected to the automatic relay as shown in Fig. 1. Pressing the push button 287 or operating the corresponding automatic relay closes the connection between lines 680 and 681 to set the master control circuit for the brick lifters as follows: from the main supply line 600 and over-load relay 602, thru a line 682 to the rotary controller 426. From the rotary controller thru any one of the level selectors LS B, C, D, E, F, G, H, or I and a line 683 to a normally closed "drop" push button 684, thru the line 680 and the switch 287 to the line 681 to a point 7 on the panel board and thence thru a line 685 to a solenoid 686, thence on a line 687 and a line 688 to the control relay 689 which is normally closed unless the over-load relay has dropped out. From the control relay 689 the circuit continues thru the line 644 to a point 2 on the main return line 601. This circuit energizes the coil 686 which operates to close a slow drop out switch 690. Closing this switch 690 sets a circuit as follows:

From the main supply line at 600 thru the over-load relay 602 and a line 603 to a point 3, from the point 3 thru a line 691 to each of a pair of parallel connected coils 693; from these coils thru a line 695 to the slow drop out switch 690 and thence thru the line 688 and the control relay 689 and the line 644 to the point 2 on the main return line 601. This circuit energizes the coils 693 which closes a pair of main line contactors 692 and 694. Closing the contactor 692 connects the brick lifter supply line 609 to the line 600 by way of the overload relay and the line 603. Closing the contactor 694 connects the brick lifter supply line 610 with the return line 601. Movable with the switch 694 is an interlock 696 which is also closed when switch 694 is closed. This interlock is connected in parallel with the push button 287 by lines 681 and 697. It therefore, maintains the previously described circuits complete even after the operator's finger has been removed from the push button.

The master control circuit is broken when the tripper 486 on the vertical stem 452 engages the trigger 496 of the "active" level selector, when the drop push button 684 is pressed, or when the control relay 689 is opened by actuation of the over-load relay.

The solenoid 686 operating the slow drop out switch 690 is a highly inductive coil which requires a fraction of a second more time to become deenergized than any of the other coils used. There is therefor a slight time lag between the breaking of the master control circuit and the opening of the switch 690. The purpose of this time lag is hereinafter stated in the section headed "Automatic control".

When the master control circuit is broken the main line contactors 692 and 694 are opened deenergizing all of the brick lifter solenoids. The opening of the contactor 694 also opens the interlock 696 which prevents the circuit from being again completed until the push button 287 or its associated automatic relay is again actuated.

*Motor wiring.*

In addition to the apparatus previously described the panel board, see Fig. 4, also mounts all of the automatic switches interlocks and resistors necessary to the control of the several motors.

It will be remembered that all of the motors are described as reversible and all are similarly controlled and all have the same parts, except the segregator motor 362 which, as before stated, is not provided with a solenoid brake. Each of the motors includes a commutating field 666 and a series field 672 in addition to the shunt field 672$^A$ and the shunt field discharge resistance 672$^B$. In addition thereto each of the motors includes a starting resistance 655 and a dynamic brake resistance 656. Controlling each starting resistance is the contact switch normally open 657 which is automatically controlled thru a starting solenoid 658 to automatically cut out the starting resistance when the motor is up to speed. Since all of the circuits are the same, except as before noted, a description of one will suffice for them all, the distinctions being that each of the motor circuits are controlled by different control circuits which will be described in detail hereinafter.

By way of example, the raising and lowering motor 469 is taken. It will be assumed that the motor is to be energized to cause down travel. In this event a pair of coils 659 is energized by a suitable control circuit. This immediately closes a pair of normally open switches 660 and 661 and simultaneously opens a normally closed switch 662. These switches complete the armature circuit for the motor as follows: from the main supply line 600 and overload relay 602 thru the line 603 to the point 3, and a branch 604 to the switch 660, thence to a line 665, thru the armature of the motor 469, the commutating field 666, a line 667, a normally closed switch 668, and a line 669, to the switch 661 which has been closed by coil 659. Thence thru a line 670 to the starting resistance 655 and thru a line 671 to the solenoid brake 397, (releasing the brake) and thence through the series field 672 and a line 673 to the point 2 on the main return line 601.

The movable portion of the switch 660 carries a switch member 663 which, when switch 660 is closed, also completes a circuit through a line 664 to the solenoid 658, the opposite end of which solenoid is connected to the armature of the motor 469 through the line 670, the switches 661 and 668 and the line 667 successively. This circuit connects solenoid 658 across the armature of the motor and when the back voltage of the armature has built up to a predetermined value the solenoid is energized to close the switch 657 which cuts out the starting resistance.

The shunt field circuit of the foregoing motor is as follows: from the live side of the overload relay 602 by a line 653 to the shunt field 672$^A$, through a line 678 to line 671 and thence to the main return line 601 by the same path as in the armature circuit. The field discharge resistance 672$^B$ is connected in parallel with the shunt field across the lines 653 and 678.

To stop the motor the control coils 659 are deenergized, the switches 660 and 661 are opened and the switch 662 is closed. The latter switch short circuits the armature of the motor through the dynamic brake resistance 656 as follows: from the armature 469 through the commutating field 666, the line 667 and the switch 668 to the dynamic brake resistance 656 and thence through the switch 662 and the line 665 back to the armature. This circuit applies dynamic braking.

To reverse the raising and lowering motor 469 a pair of coils 674 are energized by the "up" control circuit as will be hereinafter described in detail. These coils close a pair of switches 675 and 676 and open the normally closed switch 668. This sets the armature circuit as follows: from the main supply line 600 to point 3 as before: from the point 3 through the line 604 and a branch line 677, through the switch 675 and the line 667 to the commutating field 666, and the armature of the motor 469; thence through the line 665 and the switches 662, and 676, to the line 670, to the starting resistance 655; from the starting resistance through line 671, through the solenoid brake 397 (releasing the brake), through the series field 672 to point 2 on the main return line 601 through the line 673. This circuit reverses the current direction in the armature and commutating field but maintains the current direction in the series field and solenoid brake.

By similar circuits the forward rotation of the crane motor 408 is started when a pair of switches 748 and 749 are closed and a normally closed switch 748ᵃ is opened.

Similarly the reverse rotation of the crane motor 408 is started when a pair of switches 746 and 747 are closed and a normally closed switch 747ᵃ is opened. The incoming current for this motor is supplied from point 3 on a line 606 to the switches 747 and 748.

Similarly the "out" travel or travel toward the dryer car of the trolley motor 417 is started when a pair of switches 768 and 770 are closed and a normally closed switch 768ᵃ is opened.

Similarly the "in" travel of the trolley motor is started when a pair of switches 769 and 771 are closed and a normally closed switch 769ᵃ is opened.

The incoming current for the trolley motor is supplied from the point 3 through the line 604 and a branch 607 to the switches 769 and 768.

Similarly the closing motion of the segregator motor 362 is started when a pair of switches 792 and 795 are closed and a normally closed switch 792ᵃ is opened.

Similarly the opening motion of the same motor is started when a pair of switches 793 and 794 are closed and a normally closed switch 793ᵃ is opened.

The incoming current for the segregator motor is supplied from the point 3 through the line 604 and its extensions 605 and 608, to the switches 793 and 792.

Similarly the cross turn motion of the quarter turn motor 442 is started when a pair of switches 726 and 727 are closed and a normally closed switch 726ᵃ is opened.

Similarly the normal or returning motion of the same motor is started when a pair of switches 728 and 819 are closed and a normally closed switch 728ᵃ is opened.

The incoming current for the quarter turn motor is supplied from the point 3 by the lines 604 and 605, to the switches 728 and 726.

The series fields of all of the motors are connected to a pair of common return lines 673 leading to the main return line 601 at point 2.

The shunt field current for the crane motor 408 is supplied from the live side of the overload relay 602 by a line 650; that for the trolley motor by a line 654; that for the segregator by the line 651 and an extension 652; that for the quarter turn motor by the line 653 and an extension 654. Otherwise all of the shunt field circuits are exactly similar to that of the raising and lowering motor previously described.

*Motor control circuits.*

The motors may each be controlled either manually or automatically, the change from manual to automatic control and vice versa being accomplished by means of a switch 701 shown in Figs. 3 and 5, and hereinafter termed the "automatic manual" switch. This switch is multiple pole, double throw, and manually operable and has on the left side a series of contact points 841, 863, 844, 866, 849, 864, 852, 865, 870, 853 and 860 which are included in circuits for the automatic control of the several motors. On the right side of said switch is a series of contacts 739, 752, 762, 778, 786, 798, 704, 731, 808, 824 and 831, which are included in circuits for manual control of the several motors. A series of corresponding common points 740, 753, 763, 779, 787, 799, 705, 732, 809, 825 and 832 are included in the circuits leading to the motor controls on the panel board. When the switch is thrown to the left the common points are connected to their respective automatic control points and control of the motor motions is automatic. When the switch is thrown to the right the common points are connected to their respective manual control points and the motor motions are thereupon controllable by a series of manually operable push buttons. When the switch is held in an intermediate position none of the motor circuits can be completed.

Figs. 3 and 5 illustrate the corresponding manual control circuits to be identical and a description of these circuits as shown in Fig. 3 will suffice also for Fig. 5.

*Manual control—cross turning.*

The manual cross turn is controlled by a normally open push button switch 702. When this button is pressed a circuit is completed as follows:

From the main supply line 600, overload relay 602 a line 682 and a line 861 to limit switch 499, thence by a line 862 and a line 901 to the push button 702 through a line 703, to a point 704 on the automatic manual switch 701, to the point 705 on the same switch, through a line 706 to the travel limit switch LS 15, through a line 707 and the latch coils 473, through a line 708 to a "stop" push button 709, through a line 710 to a control switch 712; and thence through a line 714 to the control relay 689 and the line 644 to the point 2 on the main return line 601. This circuit operates the latch for releasing the turn table for turning as previously described. The latch coils 473 operate to bridge across the contacts 481 and make the following circuit:

From the main supply line at 600 to the limit switch LS-15, as in the circuit above described, through a line 716 and the contacts 481 to a line 634; through the line 634 to an interlock 718 and thence through a line 720 to a pair of parallel connected coils 722, and from these coils by a line 724 to the "stop" push button 709, through a line 710 to the control switch 712 and through a line 714 to the control relay 689 and through the line 644 to point 2 on the main return line 601. This circuit energizes the two coils 722 which close the switches 726 and 727 and open switch 726ª for starting the turn motor as previously described. The line 724 in this circuit leading from the coils 722 to the "stop" push button 709 is a common line for similar coils controlling the various other motor switches hereinafter described. Thus the part of the above circuit including the line 724, the stop push button 709, the line 710, the control switch 712, the line 714, the control relay 689, the line 644, to the main return line 601 is common to all of the motor control circuits hereinafter described, and therefore each of the circuits may be broken by pressing the stop push button, opening the control switch 712 or actuation of the control relay 689 by the overload relay 602 as previously described. The interlock 718 in the circuit just described is mechanically connected to the contact 728, which controls the "normal" or reverse rotation of the motor 442 in such a way that this circuit cannot be completed if the contact 728 is closed. In other words, the circuit cannot be set for cross turning if the motor is already turning in the opposite direction. The connection through limit switch LS-499 prevents this circuit from being completed unless the segregator has been raised to the extreme upper level. It therefore prevents cross turning when the segregator is positioned within the dryer car or when brick are passing through the brick lifter at the brick receiving level. The cross turning circuit as above described is broken when trigger 296 actuates limit switch LS-15 when the complete quarter turn has been made or when the operator releases the push button 702.

*Manual control—normal turning or reverse turning.*

This motion is controlled by the normally open push button 729. When this push button is pressed the circuit is completed as follows:

From the main supply line 600 to the line 901, as in the previous circuit, to push button 729, through a line 730 to the point 731 on the automatic-manual switch 701 to the point 732 on the same switch, through a line 733 to the limit switch LS-16 thence through a line 635 to an interlock 734, through a line 735 to a pair of parallel connected coils 736 and from these coils to the common line 724 and thence to the main return line 601 as in the previous circuit. This circuit energizes the coils 736 which close switches 728 and 819 and open switch 728ª which starts the "normal" rotation of the quarter turn motor as previously described. The interlock 734 is mechanically connected to the switch 726 which controls the cross turn motion in such a way that the interlock 734 is always open when switch 726 is closed. In other words, it prevents the circuit for the normal motion from being completed if the cross turning motion in the opposite direction is in progress. Limit switch 499 in this circuit performs the same function as in the previous circuit. The above circuit is broken when trigger 295 actuates limit switch LS-16 at the original or start position of the turn table, or when the operator releases the push button 729.

*Manual control—"forward" motion.*

The forward motion or motion in the direction of brick travel on the belt, is manually controlled by a push button 737. When this push button is pressed the circuit is completed as follows:

From the main supply line at 600, the overload relay and the line 627 to the push button 737, to a line 738, to the point 739 on the "automatic-manual" switch, to the point 740 on the same switch, to a line 741, through the limit switch LS-1, to a line 628 to an interlock 742, and from there through a pair of lines 743 and 744 to a pair of parallel connected coils 745, and from these coils to the common line 724 and thence to the return line 601 as in the previous circuits. The interlock 742 is mechanically connected to the switch 746, which controls the reverse rotation of the same motor, in such a way that 742 is always open when switch 746 is closed. In other words it prevents the forward circuit from being completed if the reverse motion circuit is in operation. This circuit energizes the coils 745 which close switches 748 and 749 and opens the switch 748ª, which starts the crane motor in the "forward" direction as previously described. The forward circuit is stopped when the operator releases the push button or when the crane reaches the limit switch LS-1 at the extreme limit of the crane travel.

*Manual control—reverse motion.*

The "reverse" motion of the crane is controlled by a normally open push button 750. The circuit is as follows:

From the main supply line at 600 to the line 901 as in the manual cross turning circuit, through the push button 750 and a line 751 to the point 752 on the automatic-manual switch to the point 753 on the same switch, through a line 754 and the limit switch LS-2 to a line 629, to an interlock 755, through a pair of lines 756 and 757 to a pair of parallel connected coils 758, and thence to the common line 724, and thence to the main return line 601 as in the previous circuits.

Interlock 755 is mechanically connected to switch 749 which switch controls the forward motion of the same motor in such a way that the interlock 755 is always open when switch 749 is closed. In other words, it prevents the "reverse" circuit from being completed when the "forward" motion is already in progress. The connection through limit switch 499 prevents the circuit from being completed unless the segregator has been raised to the extreme upper level clear of the dryer car. This circuit energizes the coils 758 which close the switches 747 and 746 and open the switch 747ª starting the crane motor in the reverse direction as previously described. The reverse circuit is broken when the operator releases the push button 750 or when the crane actuates the extreme limit switch LS-2.

Manual control—out motion.

The "out" motion or motion of the trolley toward the dryer car is manually controlled by an operator's push button 759. When this push button is pressed the circuit is completed as follows:

From the main supply line at 600 to the line 627 as in the manual forward circuit to the push button 759, through a line 760, to the limit switch LS-11, through a line 761 to the point 762 on the automatic-manual switch, to the point 763 on the same switch and through a line 630 to an interlock 764, and from there through a pair of lines 765 and 766 to a pair of parallel connected coils 767 and from there to the common line 724 and thence to the main return line 601 as in the previous circuits. Interlock 764 is mechanically connected to switch 771 which controls the "in" travel in such a way that the interlock is always open when contact 771 is closed. In other words, it prevents the "out" circuit from being completed if the "in" motion of the trolley is already in progress. The above described circuit energizes the two coils 767 which close the switches 768 and 770 and open switch 768ª starting the trolley motor in the "out" direction as previously described. The "out" circuit is broken when the operator releases the push button 759 or when the trolley actuates limit switch LS-11 at the extreme "out" position over the dryer car.

Manual control—"in" motion.

This motion is controlled by a push button 772. When this button is pressed the circuit is completed as follows:

From the main supply line at 600 through the over-load relay 602 and a line 682 to the rotary controller 426 and from there on a line 773 to the limit switch LS-13, to a line 774 to the limit switch 499, through a line 775 and a line 776 to the push button 772, thence through a line 777 to the point 778 on the automatic-manual switch, to the point 779 on the same switch, thence through a line 631 to an interlock 780, through a line 781, to a pair of parallel connected coils 783 and from there to the common line 724 and thence to the main return line 601 as in the previous circuits. The interlock 780 is mechanically connected to the switch 770 which controls the "out" motion of the trolley motor in such a way that the interlock is always open when the switch 770 is closed. In other words, it prevents the "in" circuit from being completed if the "out" motion of the trolley is already in progress. The above described circuit energizes the two coils 783 which close the switches 771 and 769 and open the switch 769ª starting the trolley motor in the "in" direction as previously described. The connection in the limit switch LS-499 between line 774 and 775 is only completed when this limit switch has been actuated by the machine having been raised to the highest position. In other words, the trolley cannot be moved toward the off bearing belt unless the machine has been raised to a level at which it will clear the off bearing belt and the brick traveling thereon. The "in" circuit is broken when the operator releases the push button 772 or when the trolley actuates the limit switch LS-13 at the extreme "in" position over the belt.

Manual control—closing motion.

This motion is manually controlled by a push button 784. When this button is pressed a circuit is completed as follows:

From the main supply line at 600 to the line 627 as has been previously described for the manual forward circuit, to the push button 784, to a line 785 to the point 786 on the automatic-manual switch, to the point 787 on the same switch, to a line 788 to the segregator limit switch LS-12, to a line 632, to an interlock 789, and from there on a pair of lines 790 and 791 to a pair of parallel connected coils 792ᵇ, and from these coils to the common line 724 and thence to the main return line at 601, as in the circuits previously described. Interlock 789 is mechanically connected to switch 793 which controls the opening of the segregator in such a way that the interlock is always open when contact 793 is closed. In other words it prevents the closing circuit from being completed when the segregator is in the act of opening. The above described circuit energizes the coils 792ᵇ which close the switches 792 and 795 and open the switch 792ª, starting the segregator motor in the closing direction as previously described. This circuit is broken when the operator releases the push button 784 or when the segregator limit switch LS-12 is actuated by the segregator reaching the extreme closed position.

*Manual control—open motion.*

This motion is manually controlled by a push button 796. When this button is pressed the circuit is completed as follows:

From the main supply line at 600 to the line 901 as in the manual cross turning circuit, to the push button 796, through a line 797 to the point 798 on the automatic manual switch to the point 799 on the same switch, through a line 800 to the limit switch LS-12, through a line 633 to an interlock 801 and thence on a pair of lines 802 and 803 to a pair of parallel connected coils 804 and from there on to the common line 724 and thence to the main return line 601 as in the previous circuits. The interlock 801 is mechanically connected to the switch 792 which controls the opening of the segregator, in such a way that the interlock is always open when the switch 792 is closed. In other words, it prevents the opening circuit from being completed if the segregator is in the act of closing. The connection thru limit switch 499 prevents this circuit from being completed until the segregator has been raised to the extreme upper level clear of the dryer car. This circuit energizes the two coils 804, which close the switches 793 and 794 and open the switch 793ᵃ starting the segregator motor in the "open" direction as already described. The circuit is broken when the operator releases the push button 796 or when the segregator limit switch LS-12 is actuated by the segregator reaching its extreme open position.

*Manual control—down motion.*

This motion is controlled manually by means of a pair of push buttons 805 and 806. The push button 805 is for the purpose of lowering the machine when any part of it is positioned over the off bearing belt. Push button 806 is for lowering when the machine is positioned free of the offbearing belt. When the push button 805 is pressed a circuit is completed as follows:

From the main supply line at 600 to the line 627 as in the manual forward circuit, to the push button 805, through a line 807 to the point 808 on the automatic manual switch to the point 809 on the same switch, through a line 810 to the limit switch 500, through a line 636 to an interlock 811, through a line 812 to an interlock 813 through a line 814 and a line 815 to an interlock 816 and thence on a pair of lines 817 and 818 to a pair of parallel connected coils 659 and from there to the common line 724 and thence to the main return line at 601, as in the previous circuits. The interlock 811 is mechanically connected to the switch 794, which switch controls the opening of the segregator, in such a way that the interlock is always open if the switch 794 is closed. In other words, this circuit cannot be completed if the segregator is in the act of opening. The interlock 813 is mechanically connected to the switch 819, which switch controls the normal or reverse turn of the quarter turn motor, in such a way that the interlock is always open when the switch 819 is closed. In other words, it prevents this circuit from being completed if the turn-table is in the act of returning to its normal or starting position. The interlock 816 is mechanically connected to the switch 676, which switch controls the "up" motion, in such a way that the interlock is always open when the switch 676 is closed. In other words, it prevents the "down" circuit from being completed if "up" motion is in progress. The above described circuit energizes the coils 659, which close the switches 660 and 661 and open the switch 662 starting the down travel as previously described. This circuit is broken when the operator releases the push button 805 or when the limit switch 500 is actuated by the machine being lowered to the brick receiving level. This circuit therefore can not be used to lower the brick lifters below the brick receiving level.

When the push button 806 is pressed the following circuit is completed:

From the main supply line at 600 through the overload relay 602 and the line 682 to the rotary controller 426, through one of the level selectors LS-B, C, D, E, F, G, H, or I, through the line 683 to the drop push button 684, through the line 697 to the interlock 696, through the line 681 and a line 820 to the limit switch LS-11, through a line 821 and a line 822 to the push button 806, through a line 823 to the point 824 on the automatic-manual switch, to the point 825 on the same switch, through a line 637 to an interlock 826, through a line 827 to an interlock 828, through the line 815 to the interlock 816, and thence to coils 659 and the main return line at 601 as in the previous circuit. The interlock 826 is mechanically connected to the switch 795, which switch controls the closing motion of the segregator, in such a way that the interlock is always open when the switch 795 is closed. In other words, it prevents the completion of this circuit if the segregator is in the act of closing. The interlock 828 is mechanically connected to the switch 727, which switch controls the cross turning motion of the segregator, in such a way that the interlock is always open when the switch 727 is closed. In other words, it prevents the completion of the circuit if the turn-table is in the act of cross turning. The interlock 816 in this circuit performs the same function as in the previous circuit.

This circuit energizes the two coils 659 and starts the down travel as previously described. This circuit is broken when the operator releases the push button 806 or when the active level selector is broken. The connection between the lines 820 and 821 in the limit switch LS-11 is not made unless the limit switch LS-11 has been actuated by the trolley reaching the extreme "out" position. This prevents this down circuit from being completed unless the hacking machine is free of the offbearing belt.

*Manual control—up motion.*

The up motion is manually controlled by a push button 829. When this button is pressed the circuit is completed as follows:

From the main supply line at 600, to the line 627 as in the manual forward circuit, to the push button 829, through a line 830 to the point 831 on the automatic-manual switch to the point 832 on the same switch, through a line 833 to the limit switch 499, through a line 638 to an interlock 834 and thence on a pair of lines 835 and 836 to the two coils 674 and from there to the common line 724 and thence to the main return line at 601 as in the previous circuits. Interlock 834 is mechanically connected to the switch 661, which switch controls the down motion, in such a way that the interlock is always open when the switch 661 is closed. In other words, it prevents the up circuit from being completed if the down travel is in progress. This circuit energizes the two coils 674 and starts the up travel as previously described. The circuit is broken when the operator releases the push button 829 or when limit switch 499 is actuated, by the machine reaching the extreme upper level.

*Automatic control circuits.*

The foregoing is a detailed description of the manual control of the various motor operations. These are secured through the positioning of the automatic-manual switch 701 to the right. When said switch is positioned to the left the motor control is automatic and none of the manual circuits can be completed. Two examples of the automatic control will be considered in detail.

In Fig. 3 is shown a differentiated automatic control used with a comparatively fast moving offbearing belt or with comparatively close spacing of brick travelling on the belt. This is hereinafter termed "fast belt control".

In Fig. 5 is shown a simplified, consolidated automatic control used with a comparatively slow moving offbearing belt or with a comparatively wide spacing of brick on the belt. This is hereinafter termed "slow belt control".

The sequence of operations for automatic control commonly starts with the hacking machine in a start position illustrated by hacking machine No. 3 in Fig. 1. In this illustration the first three rows of brick lifters are positioned over the offbearing belt at the proper level to receive the three rows of brick traveling on the belt. In the wiring diagrams, all limit switches are shown in the position in which they will be when the machine is in the said start position. As an example, consider limit switch LS-2 in Figs. 3 and 5. In this limit switch the circuit is shown broken and in Fig. 1 the trigger 298 on the crane of hacking machine No. 3 is shown positioned adjacent to this limit switch. As soon as the crane moves forward away from the start position sufficiently for the trigger 298 to engage the limit switch LS-2, the said limit switch takes the reverse position and the circuit through it is completed.

The form of automatic control shown in Fig. 3 will now be described in detail.

*Automatic control—fast belt operation.*

In the fast belt form of automatic operation the two components of the movement of the hacking machine from one filling stage to the next are independently initiated and independently stopped. In order to prevent collision of the oncoming column of brick with the last brick picked up by the machine, the forward crane motion circuit is completed before each stage of filling is completed and the stages of filling are completed with the crane in motion during the acceleration of the crane motor. The out trolley motion circuit is not completed until the filling of each stage is complete. Assuming eight brick lifters in each row, the forward crane travel may be initiated by the filling of the seventh, sixth, fifth, or any preceding lifter in the row, depending upon the speed of the belt, the spacing of the brick upon the belt and the acceleration rate of the motor. Herein the seventh lifter is used for that purpose. The crane and trolley travels are independently stopped by independent limit switches as hereinafter described.

With the machine in the start position, the master control circuit is set, and the first three rows of brick lifters are filled with brick as previously described. The seventh brick to enter one of its rows, as for example, No. 23 in Fig. 2, closes its appropriate switch 339—340 and makes a circuit through a line 612 as follows:

From the main supply line at 600 to the line 609 as previously described, to the contact 339 on finger No. 23 through the contact 340 and the line 612 to the limit switch LS-17, on a line 840 to the point 841 on the automatic-manual switch, to the point 740 on the same switch and thence on the line 741 through the limit switch LS-1 to the control of the forward motion of the crane motor 408 as previously described for the manual control of this motion. As the crane circuit is completed and the crane gathers speed, the eighth brick in each of the first three rows catches up to its brick lifter and is picked up. Picking up the eighth brick in a row, for example, No. 24, in the third row, initiates a circuit through a line 611 as follows:

From the main supply line at 600 to the line 609 as in the previous circuit, to the contact 339 on finger 24 to the contact 340 on the same finger, through the line 611 to the limit switch LS-4, thence on a line 842 to a line 843 to the point 844 on the automatic-manual switch to the point 763 on the same switch and from there on line 630 to the control for the out-travel of the trolley motor 417 as previously described in the section on manual control of the same motion.

It will be understood that the seventh brick in any one of the first three rows, as for example, No. 7, in row 1, or 15 in row 2, will start the forward motion as described, making the circuit through the cross tie 700 in Fig. 2. Similarly the eighth brick in each row, as for example, No. 8 in row 1 and 15 in row 2, can start the out travel of the trolley. Thus the automatic action is not hindered by removal of a brick from the belt.

When the forward travel of the crane has progressed to a point where the trigger 298 engages the fork on the limit switch LS-17 shown in Fig. 1, said limit switch is operated to open the connection between the line 612 and the line 840 and to close the connection between a line 614 and a line 845. Opening the connection 612—840 breaks the "forward" circuit and stops the crane travel. Similarly the limit switch LS-4 is operated by the trigger 297 carried on the trolley 414 to break the connection between the lines 611 and 842 and complete the connection between a line 612 and a line 846. This stops the out travel of the trolley. LS-17 has stopped the crane travel and LS-4 has stopped the out travel at such positions that the second three rows of brick lifters are aligned properly for receiving brick.

The second three rows of brick lifters, that is, rows 4, 5 and 6 are now filled in exactly the same manner as the first three rows and the circuit completed for starting the forward travel through the line 614, the limit switch LS-17, the line 845 and the limit switch LS-18, to the line 840 and thence to the forward motor controls by the same path as before. The circuit for starting the out motion of the trolley is completed through the line 613, the limit switch LS-4, the line 846, the limit switch LS-5, and the line 842 to the out motion controls by the same path as before. The forward circuit is broken when the trigger 298 actuates limit switch LS-18 to break the contact between the lines 845 and 840 and the out circuit is broken when the trigger 297 actuates the limit switch LS-5 to break the contact between the lines 846 and 842.

Successive groups of three rows of lifters are filled in like manner, the forward travel in each case being stopped by one of the limit switches LS-17 to LS-23 inclusive, successively, and the out travel being stopped in each case by one of the limit switches LS-4 to LS-10 inclusive successively.

When the seventh brick in row, 22, 23 or 24, is picked up, the circuit is made through a line 626 and the limit switch LS-23 to the line 840 to the motor controls as before. However, the forward travel this time is not stopped until the trigger 298 actuates limit switch LS-1 to stop the forward travel with the crane positioned over the dryer car. When the eighth brick in the 22nd, 23rd or 24th row is picked up, a circuit is made through a line 625 to start simultaneously three independent, separate and distinct motor motions. The out travel of the trolley is started by the following circuit: from the main supply line at 600 to the line 625 as in the previous circuits, to the limit switch LS-10 which at this point in the cycle has been moved to the opposite position from that shown on Fig. 3, thence through a line 847 to the limit switch LS-11, through the line 842 and the line 843 to the out motion controls as in the previous circuits. This circuit is broken when trigger 297 actuates limit switch LS-11 to break the contact between the lines 847 and 842. This brings the trolley as well as the crane in position over the dryer car.

At the same time the circuit is completed for closing the segregator as follows:

From the main supply line at 600 to the line 625 as before, to a line 848, to the point 849 on the automatic-manual switch to the point 787 on the same switch and from there to the closing control of the segregator motor by the same path as described in the paragraph on manual control of the same motion. This circuit is broken when the contact 393 to 394 is broken by the nut 392 in the travel limit switch LS-12 as shown in Fig. 13. This occurs when the segregator has completely closed.

At the same time quarter turn motor circuit is completed on alternate trips only, for quarter turn motion to cross hack the brick on the dryer car as follows:

From the main supply line at 600 to the line 625 as before, to a line 850 to the brush 428ᵃ on the rotary controller 426, and thence on alternate trips over the dryer car only, through the circular contact 428 and one of the segmental contacts 430 to the brush 430ᵃ, thence through a line 851 to the point 852 on the automatic-manual switch to the point 705 on the same switch and from there on the line 706 to the turning motor controls as previously described in the paragraph on manual control of the same motion. This motion is stopped when the trigger 296 on the turn table 435 actuates the limit switch LS-15 to open the contact between the line 706 and the line 716. This occurs when the turn table and segregator have been turned to an angle of 90 degrees to deposit the brick in cross hacked relation to a previously deposited course of brick.

When all of these motions have been completed, the circuit is completed for the down motion of the raising and lowering motor 469. This circuit is the same as that used for the manual control of the same motion as previously described in the paragraph on that subject, with the exception that the push button 806 is short circuited. This circuit is as follows:

From the main supply line 600 through the overload relay 602 and line 682 to brush 429ª on the rotary controller 426, and thence through circular contact 429 and one of the contacts 427 and its appropriate brush 427ª to the proper level selector LS-B, C, D, E, F, G, H or I, depending upon which level above the dryer car is desired; thence through line 683 to the drop push button 684 and line 697 to interlock 696 on the line contactor 694, which interlock is always closed when said line contactor is closed, or in other words, when the master control circuit is completed for brick engagement. From interlock 696 the circuit continues on line 681 and line 820 to limit switch LS-11 and from there on line 821 to the normally closed knife switch 854, through a line 855 to point 853 on the automatic-manual switch and from there to point 825 on the same switch, through a line 637, and the interlocks 826 and 828 to the controls for the down motion as previously described in the paragraph on the manual control of this motion. It will be remembered that interlock 826 prevents this circuit from being completed while the closing of the segregator is in progress and that interlock 828 prevents the circuit from being completed while the turning of the segregator is in progress. Likewise limit switch LS-11 prevents the circuit from being completed until the out motion has positioned the trolley over the dryer car. In this manner the segregator cannot be lowered over the dryer car until all of the three preceding motions have been completed. There is no similar interlock provided between this down circuit and the forward motion of the crane since the forward motion is invariably completed to bring the crane over the dryer car before any of the other three before mentioned motions are completed. It may be provided if desired.

The purpose of the knife switch 854 is to allow the down travel to be manually operated rather than automatically, even when all of the other motions are automatically actuated. When this switch is opened manual control of the down travel must be used.

The down motion is stopped when the tripper 486 carried on the stem 452 reaches the proper level selecting switch for setting the desired layer of brick on the dryer car. Breaking contact at the selected level selector not only stops the down travel but drops the brick as described in the paragraph headed "Master control circuits."

However, the slow drop out switch 690 which is included in the master control circuit of the brick lifters is not included in the down circuit. The slow drop out delays dropping the brick until the dynamic and solenoid brakes of the raising and lowering motor have had time to bring the motor to a stop. This delay prevents possible damage to the brick from contact with the brick lifters after deposition due to continuing travel of the motor after the circuit is broken.

Breaking the master control circuit opens the line contactors 692 and 694 whereupon the interlock 856 mechanically connected to line contactor 694 is closed. Closing said interlock 856 completes a circuit for the up travel of the raising and lowering motor as follows:

From the main supply line 600 through the overload relay 602, through line 682 and line 773 to limit switch LS-13, which limit switch at this point in the cycle is in the opposite position from that shown in Fig. 3. From limit switch LS-13 on line 774 and line 858, to the interlock 856 and from there on line 859 to point 860 on the automatic-manual switch to point 832 on the same switch, through line 833 and limit switch 499, to line 638 and the up control of the raising and lowering motor 469 as previously described in the paragraph on manual control of the same motor.

The up travel continues until the collar 498 actuates the fork of limit switch 499 to break the circuit between lines 833 and 638. This occurs when the segregator has been raised to the extreme upper level, at which level the plates of the brick lifters are above the level of the offbearing belt and the brick thereon.

When this level has been reached, the actuation of limit switch 499 simultaneously sets the circuits for four separate and distinct motor motions as follows:

The circuit for the reverse motion of the crane is from the main supply line at 600 through the overload relay 602 and the line 682 to a line 861, to limit switch 499 and a line 862 to point 863 on the automatic-manual switch, to point 753 on the same switch, through line 754 to the reverse controls of the crane motor 408, by the same path as described in the paragraph on manual control of the same motion. This circuit is broken when the trigger 298 actuates limit switch LS-2 which occurs when the crane has returned to its start position.

Simultaneously with the above the circuit for the open motion of the segregator is set from the main supply line 600 to line 862 as in the reverse crane circuit just described, to point 864 on the automatic-manual switch to point 799 on the same switch, and from there through line 800 to the opening controls of the segregator motor 362 as in the circuit previously described for the manual control of the same motion. This circuit is broken when the contacts 393ª and 394ª are separated by the nut 392 in the limit switch LS-12. This occurs when the segregator has opened into brick receiving position.

At the same time the circuit is set for the normal turn or reverse turn of the turn table, on alternate trips only, as follows:

From the main supply line 600 to line 862 as in the two circuits just described, to point 865 on the automatic-manual switch to point 732 on the same switch, through line 733, limit switch LS-16 and line 635 to the normal motor control by the same path as previously described in the paragraph on manual control of the same motion. This circuit is broken when the trigger 295 actuates the limit switch LS-16 to break the contact between lines 733 and 635. This occurs when the turn table has turned through an angle of 90 degrees to return to its start position. During cycles in which a quarter turn has not been made, LS-16 is already open so that this circuit cannot be completed and no turning motion takes place at this point.

At the same time the circuit is set for the in motion of the trolley as follows:

From the main supply line at 600, through the overload relay 602, on line 682 and line 773 to limit switch LS-13, which limit switch at this point of the cycle is in the opposite position from that shown in Fig. 3; thence through line 774 to limit switch 499, which limit switch at this point in the cycle is in the opposite position from that shown in Fig. 3, thence on line 775 to point 866 on the automatic-manual switch to point 779 on the same switch and from there on line 631 to the in control of the trolley motor 417 by the same path as previously described in the paragraph on manual control of the same motion. This circuit is only possible when limit switch 499 is in the position corresponding to the extreme upper travel of the segregator. In other words, the machine cannot move in over the belt until it has been raised to a level sufficient for the brick lifters to clear the belt and the brick thereon. This circuit is broken when the trigger 297 actuates limit switch LS-13 and breaks the contact between line 773 and 774. This occurs when the trolley has returned to the start position with the first three rows of brick lifters aligned with the three rows of brick traveling on the belt.

The segregator may now be lowered to the brick receiving level. This is accomplished by the actuation of limit switch LS-13 which sets the following circuit:

From the main supply line at 600 to limit switch LS-13 by the same path as in the circuit just described. From there on a line 867 to a normally closed knife switch 868, through a line 869 to point 870 on the automatic-manual switch to point 809 on the same switch, through line 810 to limit switch 500, through line 636 to the interlock 811 on the panel board, to interlock 813 on the panel board, to the control for the down motion of the raising motor 469 by the same path as previously described in the paragraph on the manual control of the same motion.

As will be remembered interlock 811 prevents the foregoing circuit from being completed if the segregator is in the act of opening, and interlock 813 prevents the foregoing circuit from being completed if the turn table is in the act of returning to the normal position. The open circuit in limit switch LS-13 prevents the circuit from being completed until the trolley has reached its start position over the belt. There is no electrical connection between this circuit and the reverse crane motion circuit since the crane motion is invariably completed and the circuit broken before the three previously mentioned motions are completed. The down travel motion lowers the segregator with the plates of the brick lifters straddling the path of the oncoming brick, but does not initiate the picking up of brick until the master controls are operated as previously described in the section on "master control circuits". The down travel is stopped when collar 498 on the vertical stem 452 actuates limit switch 500 to open the circuit between lines 810 and 636.

The machine has now returned to its start position and is ready for initiation of the master controls to start the picking up of brick for another cycle.

*Automatic control—slow belt operation.*

When a relatively slow off-bearing belt speed is used, the forward crane travel and the out trolley travel may both be started when the eighth or last brick lifter in each row is filled. This permits a simplified modification of wiring, the diagram of which is shown in detail in Fig. 5. Figs. 2 and 4 complete the diagram. In Fig. 5, the eighth or last brick lifters in the first three rows are represented by the numerals 8, 16 and 24, respectively. When one of these brick lifters is energized to pick up a brick, the circuits are simultaneously set for the forward and out travel.

The out circuit is from the main supply line 600 to line 609, as in the fast belt control, to brick lifter 24, through a line 711 to limit switch LS-4, through lines 842 and 843 to point 844 on the automatic-manual switch to point 763 on the same switch, through line 630 to the out controls of the trolley motor 417 as before. The forward circuit is from the main supply line 600 to line 711 as before, through limit switch LS-4 and line 842, to a limit switch LS-10ª, through a line 871 to point 841 on the automatic-manual switch to point 740 in the same switch, through line 741 and limit switch LS-1 to the forward controls of the crane motor 408 as before. These circuits are simultaneously broken when trigger 297 actuates limit switch LS-4 to break the connection between lines 711 and 842 and make the connection between lines 713 and 846.

When the fourth to sixth rows of brick are filled, the circuit is made through brick lifter 48 and line 713, limit switch LS-4, line 846, limit switch LS-5 and line 842 to the forward and out controls as before. The two motions are stopped when trigger 297 actuates limit switch LS-5.

This is repeated for each succeeding three rows of brick until the last rows are filled, when the circuits are made through brick lifter 192, a line 725 and limit switch LS-10, line 847 and limit switch LS-11. This time trigger 297 actuates limit switch LS-10ª in passing and breaks the connection between line 842 and line 871 and makes the connection between line 871 and a line 872. Line 872 is connected to the main supply line through line 682 and the overload relay 602, and thus the circuit for the forward travel now passing through this latter path is independent of the circuit of the out-travel. The out-travel this time is stopped by actuation of limit switch LS-11 and the forward travel is stopped by actuation of limit switch LS-1 to bring the trolley and crane both into position over the dryer car.

Aside from the circuits as just described all other parts of the slow belt control are exactly similar to corresponding parts of the fast belt control shown in Fig. 3.

*Variations of the automatic control.*

Other variations of the automatic control are possible and are included in this invention.

As an example, the limit switches LS-17 to LS-23 inclusive may be omitted and the circuits controlled by these switches be controlled by additional contacts placed in limit switches LS-4 to 10 inclusive, respectively. That is, limit switch LS-4 would carry two circuits in addition to those shown herein and which additions are now included in limit switch LS-17. Similarly, limit switch LS-5 would include two additional circuits controlled by limit switch LS-18 and so on. By this wiring a combination of slow belt and fast belt control is obtained whereby the forward and out travels are independently initiated as in fast belt control but are simultaneously stopped as in slow belt control.

Another variation is a fast belt control wherein the seventh brick or any other brick preceding the last brick in each row initiates the forward travel through a suitable resistance which limits the speed of the crane motor to secure slower crane speed than that of the belt. The last brick in each row is then used to cut out the said resistance to bring the crane motor up to speed and at the same time to start the trolley out travel. This system can be more advantageously used with a varying speed of belt and spacing of brick on the belt than the fast belt control of Fig. 3.

Another variation of automatic control is one for use with two hacking machines depositing on the same dryer car. The dryer car is positioned to one side of the belt and between the two hacking machine filling or start positions. The first hacking machine operates as in the preceding control systems. When the second machine has completed filling it runs "forward" and "out" to clear the brick on the belt and when clear of the brick a limit switch is actuated to stop the forward travel and start the reverse movement, moving the machine parallel to the belt in the reverse direction until it is over the dryer car. The circuits for the two machines are so interlocked that when one is depositing brick the other cannot approach the dryer car position. With this arrangement one machine would do no turning while the other would always turn the brick if alternate courses were to be cross-hacked.

Hereinbefore the controls have been described of such a character that the level of the dryer car is lower than the level of the brick when lifted. The invention includes not only the foregoing arrangement, but also an arrangement, whereby the dryer car level is the same as the level of the brick when lifted, or is higher than the level of the brick when lifted from the belt unless the claims specifically set forth a sequence of operation which necessarily includes the lowering of the brick from the lifted level to the dryer car level.

The invention claimed is:

1. The combination of a brick supporting belt, a brick receiver, and a brick handling machine comprising mechanism for picking up brick, other mechanism for segregating the same and automatically controlled by the first-mentioned mechanism and other mechanism for depositing the segregated brick in said receiver.

2. The combination of a brick supporting belt, a brick receiver, and a machine for automatically and successively picking up brick until the machine is substantially filled, segregating said brick while in said machine and depositing the segregated brick in said receiver.

3. The combination of a brick supporting belt, a brick receiver, and a brick handling machine comprising mechanism for picking up brick, other mechanism for segregating the brick while picked up and automatically operable by the first-mentioned mechanism and other mechanism for depositing the segregated brick in said receiver.

4. The combination of a brick supporting belt, a brick receiver, and a machine for picking up brick, automatically segregating said brick, and automatically depositing the segregated brick following segregation.

5. The combination of a brick supporting belt, a brick receiver, and a machine for automatically picking up brick, segregating the same and automatically depositing the segregated brick following segregation.

6. The combination of a brick supporting belt, a brick receiver, and a machine for automatically and successively picking up of the brick until the machine is substantially filled, automatically segregating said brick and automatically depositing the segregated brick following segregation.

7. The combination of a brick supporting belt, a brick receiver, and a machine for picking up brick, segregating the same, depositing the segregated brick in said receiver, and automatically repositioning said machine adjacent the supporting belt for brick reception.

8. A device of the character defined by claim 7 characterized by the machine automatically and successively picking up brick until the machine is substantially filled.

9. A device of the character defined by claim 7, characterized by the automatic picking up of the brick and the automatic segregation of the same.

10. A device of the character defined by claim 7 characterized by the automatic segregation of the brick and the automatic deposition of the segregated brick following segregation.

11. A device of the character defined by claim 7 characterized by the automatic picking up of the brick and the automatic deposition of the segregated brick following segregation.

12. A device of the character defined by claim 7 characterized by the automatic and successive picking up of the brick until the machine is substantially filled, the automatic segregation of the same and the automatic deposition of the segregated brick following segregation.

13. The combination of a brick supporting belt, a brick receiver, and a hacking machine for individually picking up brick, cross-hacking the same and depositing the cross-hacked brick in said receiver.

14. A device of the character defined by claim 13 characterized by the machine automatically and successively picking up brick until the machine is substantially filled.

15. A device of the character defined by claim 13 characterized by the automatic picking up of the brick and the automatic cross-hackng of the same.

16. A device of the character defined by claim 13, characterized by the automatic cross-hacking of the brick and the automatic deposition of the brick in cross-hacked relation.

17. A device of the character defined by claim 13, characterized by the automatic picking up of the brick and the automatic deposition thereof following cross-hacking.

18. A device of the character defined by claim 13 characterized by the automatic and successive picking up of the brick until the machine is substantially filled, the automatic cross-hacking of the same and the automatic deposition of the cross-hacked brick following cross-hacking.

19. The combination of a brick supporting belt, a brick receiver, and a hacking machine for picking up brick, segregating the same, cross-hacking the segregated brick, and depositing the segregated and cross-hacked brick in said receiver.

20. A device of the character defined by claim 19 characterized by the machine automatically and successively picking up brick until the machine is substantially filled.

21. A device of the character defined by claim 19 characterized by the automatic picking up of the brick and the automatic segregation of the same.

22. A device of the character defined by claim 19 characterized by the automatic segregation of the brick and the automatic depositon of the segregated brick following segregation.

23. A device of the character defined by claim 19 characterized by the automatic picking up of the brick and the automatic deposition of the segregated brick following segregation.

24. A device of the character defined by claim 19 characterized by the automatic and successive picking up of the brick until the machine is substantially filled, the automatic segregation of the same and the automatic deposition of the segregated brick following segregation.

25. A device of the character defined by claim 19 characterized by the automatic picking up of the brick and the automatic cross-hacking of the same.

26. A device of the character defined by claim 19 characterized by the automatic cross-hacking of the brick and the automatic deposition of the brick in cross-hacked relation.

27. A device of the character defined by claim 19 characterized by the automatic picking up of the brick, the automatic segregation of the same following picking up, and the automatic cross-hacking of the brick following picking up.

28. A device of the character defined by claim 19 characterized by the automatic segregation of the brick, the automatic cross-hacking of the brick, and the automatic deposition of the segregated and cross-hacked brick.

29. A device of the character defined by claim 19 characterized by the automatic picking up of the brick, the automatic segregation of the brick, and the automatic deposition of the segregated brick.

30. A device of the character defined by claim 19 characterized by the automatic picking up of the brick, the automatic cross-hacking of the same, and the automatic deposition of the cross-hacked brick.

31. The combination of a brick supporting belt, a stream of separated brick thereon, and a machine comprising a plurality of brick grasping devices arranged in tandem and transverse row formation, and control means for said devices for automatically and successively filling the same in tandem row formation and automatically positioning succeeding tandem rows of said devices for successive filling.

32. The combination of a brick supporting belt, a plurality of streams of separated bricks thereon, and a machine comprising a plurality of brick grasping devices arranged in tandem and transverse row formation, the number of said tandem row formations being a multiple of the number of streams of brick, and control means for said devices for automatically and successively substantially filling the number of tandem rows of devices corresponding to the number of streams of brick and automatically and successively positioning a similar number of tandem rows of devices for subsequent filling.

33. The combination of a brick supporting belt, a plurality of streams of separated brick thereon, and a machine comprising a plurality of brick grasping devices arranged in tandem and transverse row formation, and control means for said devices for automatically and successively substantially filling the number of tandem rows of devices corresponding to the number of streams of brick and automatically and successively positioning a similar number of tandem rows of devices for subsequent filling.

34. The combination of a brick supporting belt, a plurality of streams of separated brick thereon and a machine comprising a plurality of brick grasping devices arranged in tandem and transverse row formation, and control means for said devices for automatically and successively filling at least one of the number of tandem rows of devices and automatically and successively positioning at least one of the unfilled tandem rows of devices for subsequent filling.

35. The combination of a brick support, a stream of brick thereon in spaced relation and a machine including a plurality of mechanisms for picking up brick in separated relation, and other mechanism for moving said first mentioned mechanisms relatively of each other for positioning the picked up brick other than the initial spacing of first mentioned mechanisms.

36. The combination of a brick support, a stream of brick thereon in spaced relation, and a machine including mechanism for picking up brick in separated relation, and other mechanism for moving said first mentioned mechanism for moving the brick into abutting relation.

37. The combination of a brick supporting belt, a brick receiver, and a hacking machine comprising a framework adjacent both, and means carried by the framework for picking from the belt enough brick substantially to form a layer of brick and positioning the same on said receiver and returning to the belt for a second layer of brick and depositing them in cross-hacked relation to a previously deposited layer of brick on said receiver.

38. The combination of a brick supporting belt, a brick receiver, and a hacking machine comprising a framework adjacent both, and means carried by the framework for successively picking from the belt no more than a predetermined maximum of brick and positioning the same in layer formation on said receiver and returning to the belt for a second layer of brick and positioning said second layer of brick in cross-hacked relation to a previously deposited layer of brick on said receiver.

39. In a device for moving brick from a brick support adapted to support a stream of separated brick, the combination of a mechanism support, a plurality of tandem arranged brick grasping devices movably supported by said mechanism support, means connecting said devices together for successive operation, means for moving said devices with respect to said mechanism support, and a control actuated by one of the later operated brick grasping devices upon actuation thereof for actuating said moving means.

40. In a device for moving brick from a brick support adapted to support a plurality of separated brick, the combination of a mechanism support, a plurality of brick grasping devices movably supported by said mechanism support, means for moving said devices with respect to said mechanism support, and a control actuated by a predetermined brick grasping device for actuating said moving means.

41. In a device for moving brick from a brick support adapted to support a plurality of separated brick, the combination of a mechanism support, a plurality of brick grasping devices movably supported by said mechanism support, means connecting said devices together for successive operation, means for moving said devices with respect to said mechanism support, and a control actuated by a predetermined brick grasping device for actuating said moving means.

42. In a device for moving brick from a brick support adapted to support a plurality of streams of brick, the combination of a mechanism support, a plurality of brick grasping devices arranged in row formation, means connecting together for simultaneous operation a number of said devices equal to the number of streams of brick, and means for moving said brick grasping devices with respect to said mechanism support and initiable by the first operated of the connected brick grasping devices.

43. In a device for moving brick from a brick support adapted to support a plurality of streams of brick, the combination of a mechanism support, a plurality of brick grasping devices arranged in row formation, and means connecting together for simultaneous operation a number of said devices equal to the number of streams of brick, and means for moving said brick grasping devices with respect to said mechanism support and initiable by the first operated of the connected brick grasping devices which also insures operation of the remainder of the connected brick grasping devices.

44. In a device for moving brick from a brick support adapted to support a stream of brick, the combination of a mechanism support, a plurality of brick grasping devices arranged in row formation, and means for moving said mechanism support and operable by a brick grasping device for positioning a second brick grasping device for brick reception.

45. In a device for moving brick from a brick support adapted to support a plurality of streams of brick, the combination of a mechanism support, a plurality of brick grasping devices arranged in row formation, and means for moving said support and actuatable by one of said brick grasping devices for positioning a plurality of brick grasping devices for brick reception.

46. In a device for moving brick from a brick support adapted to support a plurality of streams of brick, the combination of a mechanism support, a plurality of brick grasping devices arranged in row formation, and means for moving said support and actuatable by one of said brick grasping devices for positioning a plurality of brick grasping devices for brick reception, the initially actuated brick grasping devices and the successively positioned brick grasping devices corresponding in number to the streams of brick.

47. In a device for moving brick from a brick support adapted to support separated brick, the combination of a movably mounted mechanism support, a plurality of brick grasping devices carried by said support, means connected to said mechanism support for automatically moving the same and said brick grasping devices to position one of said devices for brick reception upon actuation of another brick grasping device.

48. A device of the character defined by claim 47 characterized by the mechanism support movably supporting said brick grasping devices, and means for moving said brick grasping devices with respect to each other upon said support, and means operable upon actuation of one of said brick grasping devices for automatically moving said actuated brick grasping devices with respect to each other upon said movable support.

49. In a device for moving brick from a brick support adapted to support separated brick, the combination of a movably mounted mechanism support, a plurality of brick grasping devices carried by said support, means connected to said mechanism support for automatically moving the same and said brick grasping devices to position a plurality of said devices for brick reception upon actuation of a similar number of brick grasping devices.

50. A device of the character defined by claim 49 characterized by the mechanism support movably supporting said brick grasping devices, and means operable upon actuation of one of said brick grasping devices for automatically moving said actuated brick grasping devices with respect to each other upon said movable support.

51. A device of the character defined by claim 49 characterized by the mechanism support movably supporting said brick grasping devices for movement in two transverse directions, and means for moving said brick grasping devices with respect to each other upon said support in the two transverse directions.

52. A device of the character defined by claim 49 characterized by the mechanism support movably supporting said brick grasping devices for movement in two transverse directions, and means for simultaneously moving said brick grasping devices with respect to each other upon said support in the two transverse directions.

53. The combination of a brick support having a predetermined level, a brick receiver. having a predetermined level, and a brick handling mechanism for removing brick from the support to the receiver and automatically positioning loads of brick in successively elevated levels upon said receiver.

54. The combination as defined by claim 53 characterized by the successive picking up of brick by the mechanism until the mechanism has been substantially filled and the simultaneous deposition of all of the picked up brick.

55. The combination as defined by claim 53 characterized by the automatic elevation of the brick handling mechanism to the same predetermined level following each deposition of brick upon the brick receiver.

56. The combination as defined by claim 53 characterized by the automatic elevation of the brick handling mechanism to the same predetermined level following each deposition of the brick upon the brick receiver, and the automatic return on said level of said brick handling machine to the brick support for successive loading.

57. The combination of a brick support having a predetermined level, a brick receiver having a predetermined level, a brick handling mechanism adapted to receive brick from the support and thereafter automatically position said brick over said receiver with a predetermined clearance between said brick and the brick supporting surface of the receiver or the brick previously deposited thereon.

58. The combination of a brick receiver having a predetermined level, a brick support having a predetermined level, and a brick handling mechanism adapted to successively position brick in superposed relation upon said receiver and automatically move in a predetermined plane from said receiver to a position adjacent said support for subsequent loading.

59. The combination of a brick receiver having a predetermined level, a brick support having a predetermined level and brick handling mechanism adapted to successively deposit brick in superposed relation upon said receiver and automatically elevate above the deposited brick following deposition until the deposited brick are cleared, move to position the mechanism over the brick support to an elevation at least sufficient to clear the brick thereon, and thereafter lower the mechanism into position immediately adjacent the belt for brick engagement.

60 The combination as defined by claim 59, characterized by the mechanism automatically positioning the brick before deposition with the same clearance either above the level of the receiver or the level of the previously deposited brick thereon.

61. The combination of a brick receiver having a predetermined level, a brick support having a predetermined level, a brick handling mechanism adapted to receive brick from the support, automatically elevate the same to a predetermined plane and thereafter lower the same into position above the receiver with a predetermined clearance between the brick and the brick supporting surface of the receiver or the previously deposited brick thereon, deposit the same, and thereafter return to the brick support for subsequent loading.

62. The combination of brick receiving means, a plurality of hacking machines, a single offbearing belt having brick thereon, and a control interposed between said hacking machines for automatically insuring the loading of each of said machines, movement thereof when loaded to the brick receiving means and deposition of the brick thereon in timed relation with a similar cycle for another of said hacking machines.

63 The combination as defined by claim 62 characterized by the automatic return of each of the unloaded hacking machines to the belt for loading and the actuation for loading of each of said unloaded hacking machines by the then loading hacking machine at such time that each hacking machine is supplied with a sufficient number of brick from belt to substantially fill the same.

64. The combination as defined by claim 62 characterized by all of the hacking machines being positioned in tandem relation along the belt.

65. The combination of a plurality of brick receivers, an offbearing belt, and a plurality of hacking machines, and means connecting said hacking machines for the successive actuation of each machine for automatically and successively filling the same and transporting the brick to and depositing the same upon one of the receivers and returning to the belt for subsequent filling.

66. A combination of the character defined by claim 65, characterized by each of the hacking machines filling automatically from said belt in a plurality of stages.

67. The combination of brick receiving means, a plurality of hacking machines, a single offbearing belt having brick thereon, said hacking machines being arranged in tandem relation with respect to said belt, and a control interposed between the several hacking machines for automatically initiating the filling of one of the hacking machines at such a time as a predetermined number of brick have passed the filling position thereof.

68. The combination of brick receiving means, a plurality of hacking machines, a single offbearing belt having brick thereon, said hacking machines being arranged in tandem relation with respect to said belt, and a control interposed between the several hacking machines for automatically initiating the filling of one of the hacking machines at such time as a predetermined number of brick have passed the filling position thereof to substantially fill the last positioned hacking machine.

69. The combination as defined by claim 67, characterized by said automatic initiation of one of the hacking machine being secured at a predetermined point in the filling of another of said hacking machines.

70. In a hacking machine, the combination of mechanism for picking up brick, means for moving said brick relatively of each other, means for moving said brick with respect to the original axis thereof, means for moving said brick from one position to another position in the same plane, means for moving said brick from one plane to another, and switch means interposed between all of the before mentioned means for securing automatic actuation thereof or permitting the manual actuation thereof.

71. The combination of an offbearing belt having brick thereon, a brick receiver adjacent thereto, and a hacking machine for removing brick from the belt and transporting the same to and depositing the brick upon the receiver including an automatic manual switch for securing automatic operation of the machine or permitting the manual operation of the machine.

72. The method of hacking brick comprising picking up brick individually, arranging them in tandem and transverse row formation having predetermined relationships between brick and depositing all of the brick as a layer while in said relationship.

73. The method of handling brick, consisting of successively picking up sufficient brick to substantially form a layer thereof of predetermined dimensions, positioning said brick in predetermined relation with each other, and simultaneously depositing said brick in layer formation while maintaining said predetermined relationship.

74. The method of handling brick comprising continuously conveying brick, removing the conveyed brick at a plurality of stations, arranging the brick removed at each station in layer formation with a predetermined relationship therebetween, and depositing said brick while in layer formation and with said predetermined relationship maintained between the brick.

75. The method of handling brick as defined by claim 72, characterized by cross hacking an alternate layer of brick and depositing the same while in cross hacked relation.

76. The method of handling brick as defined by claim 73, characterized by cross hacking an alternate layer of brick, and depositing the same while in cross hacked relation.

77. The method of handling brick as defined by claim 74, characterized by cross hacking an alternate layer of brick, and depositing the same while in cross hacked relationship.

78. In a hacking machine, the combination of mechanism for picking up brick, means for moving said brick relatively of each other, means for moving said brick from one position to another in the same plane, means for moving said brick from one plane to another, and switch means interposed between all of said before mentioned means for securing automatic actuation thereof or permitting the manual operation thereof.

79. In a hacking machine, the combination of mechanism for picking up brick, means for moving said brick relatively of each other, means for moving said brick with respect to the original axis thereof, means for moving said brick from one position to another position in the same plane, and switch means interposed between all of the before mentioned means for securing automatic actuation thereof or permitting the manual actuation thereof.

80. In a hacking machine, the combination of mechanism for picking up brick, means for moving said brick relatively of each other, means for moving said brick with respect to the original axis thereof, means for moving said brick from one plane to another, and switch means interposed between all of the before mentioned means for securing automatic actuation thereof or permitting the manual actuation thereof.

81. In a hacking machine, the combination of mechanism for picking up brick, means for moving said brick from one position to another in the same plane, means for moving said brick from one plane to another, and switch means interposed between all of the before mentioned means for securing automatic actuation thereof or permitting manual actuation thereof.

82. In a hacking machine, the combination of mechanism for picking up brick, means for moving said brick relatively of each other, means for moving said brick with respect to the original axis thereof, and switch means interposed between all of the before mentioned means for securing automatic actuation thereof or permitting manual actuation thereof.

83. In a hacking machine, the combination of mechanism for picking up brick, means for moving said brick relatively of each other, means for moving said brick from one position to another position in the same plane, and switch means interposed between all of the before mentioned means for securing automatic actuation thereof or permitting manual actuation thereof.

84. In a hacking machine, the combination of mechanism for picking up brick, means for moving said brick relatively of each other, means for moving said brick from one plane to another, and switch means interposed between all of the before mentioned means for securing automatic actuation thereof or permitting manual actuation thereof.

85. In a hacking machine, the combination of mechanism for picking up brick, means for moving said brick with respect to the original axis thereof, means for moving said brick from one position to another in the same plane, and switch means interposed between all of the before mentioned means for securing automatic actuation thereof or permitting manual actuation thereof.

86. In a hacking machine, the combination of mechanism for picking up brick, means for moving said brick with respect to the original axis thereof, means for moving said brick from one plane to another, and switch means interposed between all of the before mentioned means for securing automatic actuation thereof or permitting manual actuation thereof.

87. In a hacking machine, the combination of mechanism for picking up brick, means for moving said brick from one position to another in the same plane, means for moving said brick with respect to the original axis thereof, means for moving said brick from one plane to another, and switch means interposed between all of the before mentioned means for securing automatic actuation thereof or permitting the manual operation thereof.

88. In a hacking machine, the combination of brick lifting means, segregating means for moving said brick lifting means relatively of each other, a supporting framework, a crane movably supported thereon, a trolley movably supported on said crane for movement transversely of the crane movement, a turn table rotatably supported upon said trolley, and a support movable transversely of said turn table, trolley and crane and supporting said segregator for raising and lowering the latter.

89. A device as defined by claim 88, including the addition of individual power means for securing each of the foregoing movements, and control means associated with said power means for automatically operating the same in predetermined timed relation.

90. In a hacking machine for removing brick from a belt, the combination of brick lifting means, segregator means for moving said brick lifting means relatively of each other, a framework, a support movably supported by said framework for movement in a plane parallel the belt, a turn table rotatably supported with respect to said support and another support supported by said last mentioned support for movement transversely of the first support movement plane for raising and lowering the segregator means with respect to said plane.

91. A device as defined by claim 90, including the addition of individual power means for securing each of the foregoing movements, and a control associated with said power means for automatically operating the same in predetermined timed relation.

92. In a hacking machine for removing brick from a belt, the combination of brick lifting means, a support therefor, a framework, a second support movably supported by said framework for movement in a plane parallel to the belt, a turn table rotatably supported by said second mentioned support for turning said first mentioned support, said first mentioned support being movably supported upon said turn table for movement transversely to the second support movement plane.

93. A device as defined by claim 92 including the addition of individual power means for securing each of the before mentioned movements, and a control for said power means for securing automatic operation thereof in predetermined timed relation.

94. In a hacking machine for removing brick from a belt, the combination of brick lifting means, segregator means supporting said brick lifting means for securing predetermined relative movement between the same, a framework, a support movably supported thereon for movement in a plane parallel to the belt, and a second support supported by said first mentioned support and supporting said segregator means and having movement transverse to the plane of the movement of the first mentioned support.

95. A device as defined by claim 94 including the addition of individual power means for securing each of the before mentioned movements, and control means for automatically operating said individual power means in predetermined timed relation.

96. In a hacking machine for removing brick from a belt, the combination of brick lifting means, segregator means supporting the same for relative movement therebetween, a framework, a support thereon movably supported thereby for movement in a plane parallel to the belt, and a rotatable support rotatably supported by said first mentioned support and supporting said segregator means.

97. A device as defined by claim 96, including the addition of individual power means for securing each of the before mentioned movements, and a control for securing automatic operation of said several power means in predetermined timed relation.

98. In a hacking machine for removing brick from a belt, the combination of brick lifting means, segregating means supporting the same for relative movement therebetween, a framework, a support movably supported thereby for movement transverse to a plane parallel to the belt, and another support rotatably supported by said framework for supporting and turning said first mentioned support.

99. A device as defined by claim 98 including the addition of individual power means for securing each of the foregoing movements, and a control for securing automatic operation of said several power means in predetermined timed relation.

100. In a hacking machine for removing brick from a belt, the combination of brick lifting means, segregator means supporting the same for relative movement therebetween, a framework, and a segregator support movably supported thereby for movement in a plane parallel to the belt.

101. A device as defined by claim 100, including the addition of individual power means for securing each of the foregoing movements, and a control for securing automatic operation of said several power means in predetermined timed relation.

102. In a hacking machine for removing brick from a belt, the combination of brick lifting means, segregating means supporting the same for relative movement therebetween, a framework, and another support rotatably supported by said framework for supporting and turning said segregator means.

103. A device as defined by claim 102, including the addition of individual power means for securing each of the foregoing movements, and a control for securing automatic operation of said several power means in predetermined timed relation.

104. In a hacking machine for removing brick from a belt, the combination of brick lifting means, segregator means supporting the same for relative movement therebetween, a framework, a support supported thereby for movement transverse to the plane parallel to the belt for supporting and moving said segregator means.

105. A device as defined by claim 104 including the addition of individual power means for securing each of the foregoing movements, and a control for securing automatic operation of said several power means in predetermined timed relation.

106. In a hacking machine for removing brick from a belt, the combination of brick lifting means, a framework, a support movably supported thereby for movement in a plane parallel to the belt, and another support rotatably supported by said first mentioned support for supporting and turning said brick lifting means.

107. A device as defined by claim 106 including the addition of individual power means for securing each of the foregoing movements, and a control for securing automatic operation of said several power means in predetermined timed relation.

108. In a hacking machine for removing brick from a belt, the combination of brick lifting means, a framework, a support movably supported thereby for movement in a plane parallel to the belt, and another support supporting said lifting means and supported by said first mentioned support and having movement transverse to the first support movement plane.

109. A device as defined by claim 108 including the addition of individual power means for securing each of the foregoing movements, and a control for securing automatic operation of said several power means in predetermined timed relation.

110. In a hacking machine for removing brick from a belt, the combination of brick lifting means, a framework, a turn table supported thereby for rotational movement with its axis transverse to a plane parallel to the belt, and another support for supporting said brick lifting means and supported by said last mentioned support for movement longitudinally of said transverse axis for raising and lowering the brick lifting means with respect to said plane.

111. A device as defined by claim 110 including the addition of individual power means for securing each of the foregoing movements, and a control for securing automatic operation of said several power means in predetermined timed relation.

112. A device as defined by claim 90 including the addition of individual reversible power means for securing each of the before mentioned movements, and travel limit switch means for each of the individual power means for limiting said reversible movements to predetermined distances.

113. A device as defined by claim 92 including the addition of individual reversible power means for securing each of the before mentioned movements, and travel limit switch means for each of the individual power means for limiting said reversible movements to predetermined distances.

114. A device as defined by claim 94 including the addition of individual reversible power means for securing each of the before mentioned movements, and travel limit switch means for each of the individual power means for limiting said reversible movements to predetermined distances.

115. A device as defined by claim 96 including the addition of individual reversible power means for securing each of the before mentioned movements, and travel limit switch means for each of the individual power means for limiting said reversible movements to predetermined distances.

116. A device as defined by claim 98 including the addition of individual reversible power means for securing each of the before mentioned movements, and travel limit switch means for each of the individual power means for limiting said reversible movements to predetermined distances.

117. A device as defined by claim 100 including the addition of individual reversible power means for securing each of the before mentioned movements, and travel limit switch means for each of the individual power means for limiting said reversible movements to predetermined distances.

118. A device as defined by claim 102 including the addition of individual reversible power means for securing each of the before mentioned movements, and travel limit switch means for each of the individual power means for limiting said reversible movements to predetermined distances.

119. A device as defined by claim 104 including the addition of individual reversible power means for securing each of the before mentioned movements, and travel limit switch means for each of the individual power means for limiting said reversible movements to predetermined distances.

120. A device as defined by claim 106 including the addition of individual reversible power means for securing each of the before mentioned movements, and travel limit switch means for each of the individual power means for limiting said reversible movements to predetermined distances.

121. A device as defined by claim 108 including the addition of individual reversible power means for securing each of the before mentioned movements, and travel limit switch means for each of the individual power means for limiting said reversible movements to predetermined distances.

122. A device as defined by claim 110 including the addition of individual reversible power means for securing each of the before mentioned movements, and travel limit switch means for each of the individual power means for limiting said reversible movements to predetermined distances.

123. In a hacking machine, the combination of a relatively stationary support, a turn table rotatably supported thereby, power means for turning said turn table upon said support, a latch and catch construction interposed between said turn table and said support, and a control for releasing said latch prior to actuation of said power means.

124. In a hacking machine, the combination of a relatively stationary support, a second support movable relative thereto, a tongue carried by one of said supports, a socket carried by the other support, and a yielding connection between said tongue and socket for said socket receiving said tongue in the relative movement of said supports and retaining said supports in predetermined position.

125. In a hacking machine, the combination of a relatively stationary support, a second support relatively movable thereto, a tongue carried by one of said supports, a socket carried by the other support, a yielding connection between said tongue and socket permitting relative movement between said supports until said tongue and socket register and thereafter maintain said supports in predetermined relation, and a control for disconnecting said tongue and socket to permit relative movement of said supports.

126. A device as defined by claim 125 including the addition of power means for securing said relative movement between said supports, and a switch controlling said power means and arranged for operation for securing said power means operation only when said control means is actuated.

127. A combination as defined by claim 104, characterized by the addition of individual power means for securing each of the before mentioned movements, and an interlock between said power means whereby the power means for securing the second mentioned movement is inoperable during the operation of the power means for securing the first mentioned movement.

128. A combination as defined by claim 110, characterized by the addition of individual power means for securing each of the before mentioned movements, and an interlock between said power means whereby the power means for securing the second mentioned movement is inoperable during the operation of the power means for securing the first mentioned movement.

129. In a hacking machine, the combination of a plurality of relatively movable parts, a reversible power means for actuating one of said movable parts for securing predetermined movement thereof with respect to the remaining parts, a control for actuating said power means in one direction, a second control for actuating said power means in the opposite direction, and an interlock between said controls, whereby either control is inoperable during the operation of the power means while under the control of the other control.

130. In a hacking machine, the combination of a plurality of parts having relative movement with respect to each other, individual power means for each of a plurality of parts for securing a predetermined relative movement thereof with respect to another of said parts, a control for each of said power means for securing actuation thereof in a predetermined direction, and another control for each of said power means for securing actuation of the said power means in the opposite direction, and a plurality of interlocks, each interposed between a pair of controls whereby one control of each pair is inoperable during the operation of the power means while under the control of the other control means.

131. In a hacking machine, the combination of a support, a trolley movably supported thereon, a turn table rotatably supported upon said trolley, a motor for actuating said turn table, and a rotary controller automatically rotatable in the reciprocatory movement of the trolley upon the support for actuating said turn table motor for turning.

132. In a hacking machine, the combination of a support, a trolley movably supported thereby, a member movably supported by said trolley, power means for moving said last mentioned member transversely of the plane of movement of the trolley, and a rotary controller automatically operable in the reciprocatory movement of the trolley for actuating the power means to move the member transversely of the trolley movement plane.

133. In a hacking machine, the combination of a support, a trolley movably supported thereby, a turn table rotatably supported by the trolley, a member coaxial with the axis of the turn table and supported thereby, power means for turning the table upon the trolley, other power means for moving the member with respect to said turn table in a direction transverse to the plane of the movement of the turn table, and a rotary controller automatically operable by the movement of the trolley upon its support for conditioning both power means for operation.

134. In a hacking machine, the combination of a supporting framework, a support movably supported thereby a member movably supported by said support for movement transverse to the plane of movement of the support upon said framework, a controller automatically operable in the movement of said support upon said framework and including a plurality of controls arranged in successive relation, a similar number of controls arranged in superposed relation, said superpositioned spacing being proportional to predetermined distances for securing selective levels of the member, power means for moving said member from one level to another, and connections between the controls of said controller and the superposed controls for controlling said power means to position automatically said member at a predetermined level.

135. In a hacking machine, the combination of a supporting stem member, a support member therefor, power means for causing relative movement between said members, a plurality of switches supported in superposed relation by one of said members, and a trigger carried by the other of said members for actuating one of said switches for controlling said power means.

136. A device as defined by claim 135, including a control means interposed between said switches and said power means, whereby but one of said switches is conditioned for controlling said power means at a given time and wherein said trigger may engage said switches without controlling said power means until the control conditioned switch is engaged by the trigger.

137. In a hacking machine, the combination of an elongated trackway, a crane movably supported thereon, said crane including an elongated trackway positioned substantially transverse to the crane supporting trackway, a trolley movably supported upon said crane supported trackway, power means for said crane, power means for said trolley, and control means for both of said power means for automatically securing simultaneous step by step movement of said crane and trolley.

138. A device as defined by claim 137 characterized by an additional control for securing the simultaneous stoppage of both of said power means.

139. A device as defined by claim 137 characterized by an additional control for securing the simultaneous starting of both of said power means.

140. A device as defined by claim 137 characterized by an additional control for securing the simultaneous starting and stopping of both of said power means.

141. In a hacking machine, the combination of a plurality of relatively movable parts, a plurality of individual power means for securing the several relative movements between said parts, a switch point for each of said power means and connected thereto, an automatic control for each of the power means and having a switch point, a manual control for each of the power means and having a switch point, and a movable switch member for simultaneously connecting all the power connected switch points selectively to the automatic and manual switch points.

142. In a hacking machine, the combination of a plurality of brick lifting devices, a plurality of supporting members therefor having several relative movements with respect to each other, individual power means for securing the respective relative movements, and control means for said power means automatically actuatable by said devices for conditioning all of said power means for operation.

143. In a hacking machine, the combination of a plurality of brick lifting devices, a plurality of supporting members therefor having several relative movements with respect to each other, individual power means for securing the respective relative movements, and control means for said power means automatically actuatable by said devices for simultaneously actuating a predetermined plurality of said power means.

144. The combination of brick receiving means, brick supporting and supplying elongated belt means, a pair of elongated trackways extending parallel to said elongated belt means, and a plurality of unitary mechanisms movably mounted upon said trackways for picking up brick from the belt means and depositing the picked up brick upon said brick receiving means, and an inter-control between said unitary mechanisms for securing predetermined and non-interfering operation thereof.

145. In a hacking machine, the combination of a support, a member supported thereby, said support and member having relative cyclic movement therebetween, and a rotary controller automatically and unidirectionally rotatable in the relative cyclic movement.

146. In a hacking machine, the combination of at least three severally relatively movable parts, a plurality of power means for securing the several relative movements, and an interlock between said power means preventing operation of one of said power means while another of said power means is operated.

147. In a hacking machine, the combination of three or more severally relatively movable parts, a plurality of power means for securing the several relative movements, travel limit means for indicating the amount of the relative movement between a plurality of parts, and means connecting said travel limit means to one of said power means, whereby a certain predetermined maximum relative movement must be obtained of another of said power means before the first mentioned power means is actuated to secure additional predetermined relative movement.

148. In a hacking machine, the combination of three or more severally relatively movable parts, a plurality of power means for securing the several relative movements, travel limit means for indicating the amount of relative movement between a plurality of parts, and means connecting said travel limit means to one of said power means, whereby the relative movement then in progress is caused to cease at a predetermined distance and a second relative movement by another of said power means is automatically initiated.

149. In a hacking machine the combination of a supporting framework, a support member movably supported thereby, brick supporting means, means for lowering said brick supporting means with respect to said support member, and travel limit means actuated in the relative movement of said support member with respect to said framework for controlling said lowering means to prevent lowering of said brick supporting means below a predetermined level until said support member is in a predetermined position relative to said framework.

150. In a hacking machine for removing brick from a brick support, the combination of a supporting framework, a support member supported thereon for movement angularly of the brick support, brick lifting means supported by said support member, means for lowering said brick lifting means with respect to the brick support, and travel limit means actuated by movement of said support member relative to said framework for preventing actuation of said lowering means for lowering said brick lifting means below a predetermined level when said brick lifting means is positioned over the brick support.

151. In a hacking machine for depositing brick in a brick receiver, the combination of a supporting framework, a support member supported thereon for movement to and from the brick receiver, brick supporting means supported by said support member, means for lowering said brick supporting means with respect to the brick receiver, and travel limit means actuated by movement of said support member relative to said framework for preventing actuation of said lowering means for lowering said brick supporting means below a predetermined level when said brick supporting means is not positioned over the brick receiver.

152. In a hacking machine, the combination of a supporting framework, a support member movably supported thereon, brick supporting means supported by said support member for movement from one level to another, power means for moving said support member with respect to said framework, and travel limit means actuated in said level to level movement for preventing the actuation of said power means unless said brick supporting means is above a predetermined level.

153. In a hacking machine for removing from a brick support the brick thereon, the combination of a supporting framework, a support member supported thereon for movement angularly of the brick support, brick lifting means supported by said support member for movement from one level to another with respect to the brick support, power means for moving said support member with respect to said framework, and travel limit means actuated in said level to movement for preventing actuation of said power means for movement of said support member toward the brick support unless said brick lifting means is above the level of the brick support and brick thereon.

154. In a hacking machine for depositing brick on a brick receiver, the combination of a supporting framework, a support member supported thereon for movement to and from the brick receiver, brick supporting means supported by said support member for movement from one level to another with respect to the brick receiver, power means for moving said support member with respect to said framework, and travel limit means actuated in said level to level movement for preventing actuation of said power means unless said brick lifting means is above the level of the brick receiver and any brick thereon.

155. In a hacking machine, the combination of brick supporting means, mechanism for moving said means with respect to each other, power means for actuating said mechanism, a support member supporting and moving said brick supporting means from one level to another, and travel limit means operable in said level to level movement for preventing the actuation of said power means unless said brick supporting means is above a predetermined level.

156. In a hacking machine for depositing brick on a brick receiver, the combination of brick supporting means, mechanism for moving said brick supporting means with respect to each other, power means for actuating said mechanism, a support member supporting and moving said brick supporting means from one level to another relatively of said brick receiver, and travel limit means preventing actuation of said power means unless said brick supporting means is above the level of the brick receiver and any brick thereon.

157. In a hacking machine, the combination of brick supporting means, mechanism for moving said brick supporting means with respect to the original axis thereof, power means for actuating said mechanism, a support member supporting and moving said brick supporting means from one level to another, and travel limit means operable in said level to level movement for preventing the actuation of said power means unless said brick supporting means is above a predetermined level.

158. In a hacking machine for depositing brick on a brick receiver, the combination of brick supporting means, mechanism for moving said brick supporting means with respect to the original axis thereof, power means for actuating said mechanism, a support member supporting and moving said brick supporting means from one level to another relatively of said brick receiver, and travel limit means for preventing actuation of said power means unless said brick supporting means is above the level of the brick receiver and any brick thereon.

159. In a hacking machine for removing from a brick support the brick thereon, the combination of brick supporting means, mechanism for moving said brick supporting means with respect to the orginal axis thereof, power means for actuating said mechanism, a support member supporting and moving said brick supporting means from one level to another relatively of said brick receiver, and travel limit means actuated in said level to level movement for preventing actuation of said power means for movement of said support member toward the belt unless said brick supporting means is above the level of the brick receiver and brick thereon.

160. The combination of a brick support, a brick receiver, and a machine for automatically and successively picking up brick from said support until the machine is substantially filled and subsequently depositing the picked up brick in said receiver.

161. The combination of a brick support, a stream of brick thereon in separated relation, and a machine for picking up brick in said relation and thereafter moving the brick into a relationship other than the initial relation.

162. The combination of a brick support, a stream of brick thereon in separated relation, and a machine for picking up brick in said relation and thereafter moving the brick into abuttable relationship.

163. The combination of a brick support, a stream of brick thereon in spaced relation, and a machine for picking up brick in separated but another spaced relation and thereafter moving the brick into a relationship other than either of spaced relationships.

164. The combination of a brick support, a stream of brick thereon in separated relation, and a machine for successively picking up the brick and moving the same into a relationship other than the initial relationship.

165. A device of the character defined by claim 7 characterized by the automatic segregation of the brick.

166. A device of the character defined by claim 1 characterized by the depositing mechanism being automatically actuated upon completion of the picking up and segregation for automatic deposition of the brick.

167. A device of the character defined by claim 7 characterized by the automatic deposition of the brick.

168. A device of the character defined by claim 13 characterized by the automatic deposition of the brick.

169. A device of the character defined by claim 19 characterized by the automatic deposition of the brick.

170. A device of the character defined by claim 19 characterized by the automatic segregation of the brick.

171. A device of the character defined by claim 13 characterized by the automatic cross-hacking of the brick.

172. A device of the character defined by claim 19 characterized by the automatic cross-hacking of the brick.

173. A device of the character defined by claim 19 characterized by the automatic segregation of the brick, and the automatic cross hacking of the same.

174. In a device for moving brick from a support adapted to support a plurality of separated brick, the combination of a mechanism support, a plurality of brick grasping devices movably supported by said mechanism support, means for moving said devices with respect to said mechanism support, and a control actuated by the first actuated of a plurality of predetermined brick grasping devices for actuating said moving means.

In witness whereof, I have hereunto affixed my signature.

GRAFTON E. LUCE.